United States Patent
Agarwal et al.

(10) Patent No.: US 11,792,236 B2
(45) Date of Patent: Oct. 17, 2023

(54) 5G SYSTEM (5GS) FAILURE DETECTION MONITORING OF PROXY-CALL SESSION CONTROL FUNCTION (P-CSCF) OF AN INTERNET PROTOCOL (IP) MULTIMEDIA SYSTEM (IMS) FOR EFFICIENT RESTORATION OF IMS SERVICE

(71) Applicant: Cisco Technology, Inc., San Jose, CA (US)

(72) Inventors: Vivek Agarwal, Apex, NC (US); Rajaneesh Sudhakar Shetty, Bangalore (IN); Raghavendra Suryanarayanarao Vidyashankar, Bangalore South (IN); Arun Gunasekaran, Bangalore (IN); Filipe Alexandre Da Silva Rodrigues, Düsseldorf (DE)

(73) Assignee: CISCO TECHNOLOGY, INC., San Jose, CA (US)

( * ) Notice: Subject to any disclaimer, the term of this patent is extended or adjusted under 35 U.S.C. 154(b) by 144 days.

(21) Appl. No.: 17/153,416

(22) Filed: Jan. 20, 2021

(65) Prior Publication Data
US 2022/0232046 A1    Jul. 21, 2022

(51) Int. Cl.
*H04L 65/1016*    (2022.01)
*H04L 65/1069*    (2022.01)
(Continued)

(52) U.S. Cl.
CPC ...... *H04L 65/1016* (2013.01); *H04L 65/1069* (2013.01); *H04L 65/1073* (2013.01); *H04L 65/1104* (2022.05)

(58) Field of Classification Search
CPC ............. H04L 65/1016; H04L 65/1006; H04L 65/1069; H04L 65/1073
See application file for complete search history.

(56) References Cited

U.S. PATENT DOCUMENTS

2011/0128843 A1*  6/2011  Przybysz ............... H04L 43/50
                                                          370/216
2012/0042084 A1*  2/2012  Dutta .................. H04L 65/1069
                                                          709/228
(Continued)

FOREIGN PATENT DOCUMENTS

WO    2020/008292 A1    1/2020

OTHER PUBLICATIONS

3GPP, "3rd Generation Partnership Project; Technical Specification Group Core Network and Terminals; IMS Restoration Procedures (Release 16)", 3GPP TS 23.380 V16.2.0, Dec. 2019, 56 pages.
(Continued)

*Primary Examiner* — Khaled M Kassim
(74) *Attorney, Agent, or Firm* — Edell, Shapiro & Finnan, LLC

(57) ABSTRACT

Techniques and mechanisms for Fifth Generation (5G) system (5GS) failure detection monitoring of an application or control function in a network for efficient restoration of service are described. The network may be an Internet Protocol (IP) Multimedia Subsystem (IMS) network, and the voice or data service may be an IMS service that utilizes Session Initiation Protocol (SIP) signaling. The application or control function may be a Proxy-Call Session Control Function (P-CSCF) of the IMS network. In some implementations, the procedure may involve a session management function (SMF) programming of a user plane function (UPF) for UPF monitoring of the P-CSCF, using a ping procedure or health check procedure (e.g. for 3GPP Pre-Release 16). In other implementations, the procedure may involve the SMF monitoring of a P-CSCF via a Network Function (NF) Repository Function (NRF) (e.g. for 3GPP Release 16).

20 Claims, 14 Drawing Sheets

(51) Int. Cl.
*H04L 65/1073* (2022.01)
*H04L 65/1104* (2022.01)

(56) References Cited

U.S. PATENT DOCUMENTS

| | | | |
|---|---|---|---|
| 2015/0124588 A1* | 5/2015 | Hallenstal | H04L 65/1016 370/221 |
| 2015/0195864 A1 | 7/2015 | Bartolome Rodrigo et al. | |
| 2019/0098547 A1* | 3/2019 | Chong | H04W 76/12 |
| 2019/0123954 A1 | 4/2019 | Kunz et al. | |
| 2019/0191330 A1* | 6/2019 | Dao | H04L 12/4633 |
| 2019/0215731 A1* | 7/2019 | Qiao | H04W 24/10 |
| 2019/0261449 A1* | 8/2019 | Kim | H04W 64/003 |
| 2019/0268276 A1* | 8/2019 | Lee | H04L 47/36 |
| 2020/0178336 A1* | 6/2020 | Li | H04W 80/10 |
| 2020/0344273 A1* | 10/2020 | Sinha | H04L 65/1073 |
| 2021/0044629 A1* | 2/2021 | Hallenst 1 | H04L 61/6095 |
| 2021/0099367 A1* | 4/2021 | Han | H04W 24/10 |
| 2021/0266349 A1* | 8/2021 | Foti | H04L 65/1069 |
| 2021/0320897 A1* | 10/2021 | Stojanovski | H04L 61/1511 |
| 2021/0329098 A1* | 10/2021 | Bartolome Rodrigo | H04L 67/142 |

OTHER PUBLICATIONS

3GPP, "3rd Generation Partnership Project; Technical Specification Group Services and System Aspects; Procedures for the 5G System (5GS); Stage 2 (Release 16)", 3GPP TS 23.502 V16.7.0, Dec. 2020, pp. 1-2 and 373-375.

3GPP, "3rd Generation Partnership Project; Technical Specification Group Core Network and Terminals; IP multimedia call control protocol based on Session Initiation Protocol (SIP) and Session Description Protocol (SDP); Stage 3 (Release 17)", 3GPP TS 24.229 V17.1.0, Dec. 2020, pp. 1-2 and 938-942.

3GPP, "3rd Generation Partnership Project; Technical Specification Group Core Network and Terminals; 5G System; Policy and Charging Control signalling flows and QoS parameter mapping; Stage 3 (Release 17)", 3GPP TS 29.513 V17.1.0, Dec. 2020, 145 pages.

3GPP, "3rd Generation Partnership Project; Technical Specification Group Core Network and Terminals; 5G System; Session Management Policy Control Service; Stage 3 (Release 17)", 3GPP TS 29.512 V17.1.0, Dec. 2020, 208 pages.

3GPP, "3rd Generation Partnership Project; Technical Specification Group Core Network and Terminals; 5G System; Policy Authorization Service; Stage 3 (Release 16)", 3GPP TS 29.514 V16.7.0, Dec. 2020, 178 pages.

Jones, P. et al, Network Working Group, "Using Options to Query for Operational Status in the Session Initiation Protocol (SIP) draft-jones-sip-options-ping-01.txt," https://tools.ietf.org/html/draft-jones-sip-options-ping-01, May 4, 2020, 8 pages.

\* cited by examiner

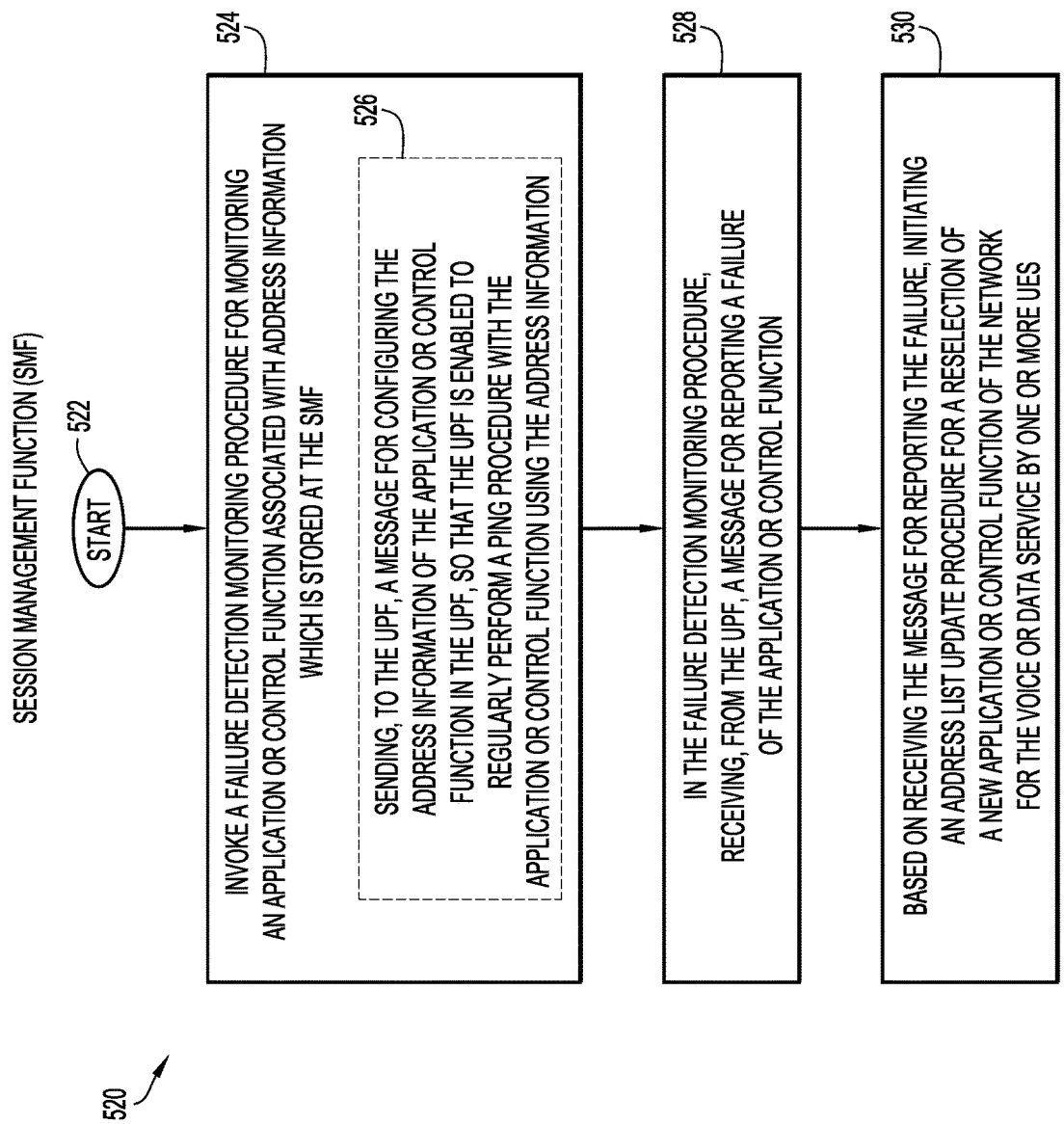

5G SYSTEM (5GS) FAILURE DETECTION MONITORING OF PROXY-CALL SESSION CONTROL FUNCTION (P-CSCF) OF AN INTERNET PROTOCOL (IP) MULTIMEDIA SYSTEM (IMS) FOR EFFICIENT RESTORATION OF IMS SERVICE

TECHNICAL FIELD

The present disclosure relates generally to telecommunications systems, and more particularly to 5G System (5GS) failure detection monitoring of a Proxy-Call Session Control Function (P-CSCF) of an Internet Protocol (IP) Multimedia System (IMS) for efficient restoration of IMS service for multiple mobile devices.

BACKGROUND

Traditionally, voice call services have been provided over a circuit-switched type network. Today, voice and video call services for mobile devices may be provided over an IP packet-switched network using an IP Multimedia Subsystem (IMS). In general, IMS is an architectural framework for delivering IP multimedia services. Voice and video call services based on IMS are critical services that every service provider (SP) mobile operator would like to offer.

In a Fifth Generation (5G) network, a Voice over New Radio (VoNR) service may be offered. VoNR provides significantly lower latency and improved sound & picture quality, resulting in an extremely elevated calling experience. An SP mobile operator would like to ensure that services, such as VoNR, are provided with high availability and reliability. Given that service failures may occur, an efficient service failure detection and restoration should be considered.

In a 5G system (5GS) deployment, a Proxy-Call Session Control Function (P-CSCF) is the IMS core component that performs IMS signaling processing for IMS services. To establish service, a user equipment (UE) may receive a P-CSCF address of the P-CSCF in a message which includes a Protocol Configuration Options (ePCO) container. During operation, the P-CSCF may fail and, as a result, service may become unavailable.

An SP mobile operator should expect that failures of IMS components/instances are quickly detected by the 5G core for proactive restoration of services to all impacted voice or video call users—not merely a reactive restoration of service for a single user at a time.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5B is a flowchart for describing a method of failure detection monitoring of an application or control function for efficient service restoration according to some implementations of the present disclosure, which may be a second type of failure detection monitoring procedure (e.g. for 3GPP Pre-Release 16);

DESCRIPTION OF EXAMPLE EMBODIMENTS

Figure 1A:
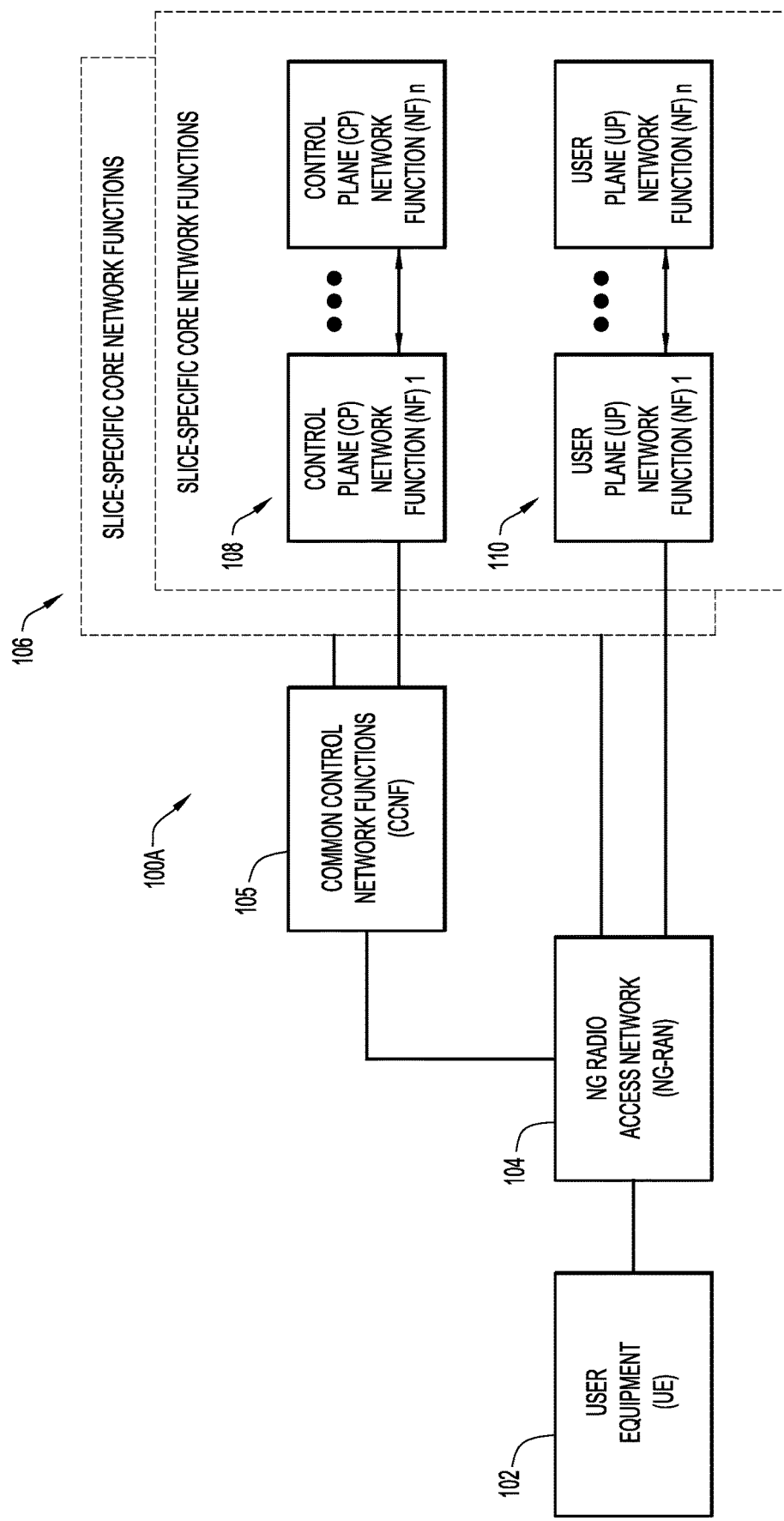
FIG. 1A is an illustrative representation of a basic network architecture of a Fifth Generation (5G) network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms for 5G system (5GS) failure detection monitoring of an application or control function in a network for efficient restoration of service are described herein. The network may be an Internet Protocol (IP) Multimedia Subsystem (IMS) network and the voice or data service may be an IMS service that utilizes Session Initiation Protocol (SIP) signaling. The application or control function may be a Proxy-Call Session Control Function (P-CSCF) of the IMS network; alternatively, the application or control function may be an application function (AF).

In a first aspect of the present disclosure, a UPF of a mobile network may be configured to forward traffic for a voice or data service between one or more UEs operative in the mobile network and an application or control function of a network. In some implementations, the UPF may receive, from an SMF, a message which includes address information of the application or control function and store the address information in memory. The UPF may invoke a failure detection monitoring procedure for monitoring the application or control function associated with the address information of the application or control function. The failure detection monitoring procedure may include regularly performing a ping procedure (or health check procedure) with the application or control function using the address information. Sometime during operation, the UPF may identify a failure of the application or control function from the failure detection monitoring procedure. Based on the identifying, the UPF may send, to the SMF, a message for reporting the failure of the application or control function. The message may trigger, at the SMF, an initiation of an address list update procedure for a reselection of a new application or control function of the network for the voice or data service by the one or more UEs. The one or more UEs may be a plurality of UEs which are updated with new address information for the voice or data service. In some implementations, the ping procedure may involve sending a SIP OPTIONS message to query for operational status of the application or control function. In other implementations, the ping procedure may involve sending an ICMP echo request message to the application or control function. According to the first aspect, the UPF which performs the failure detection monitoring procedure may be for use in the mobile network which interconnects to the IMS network via a Diameter Rx interface or an SBI without eSBA support (e.g. 3GPP Pre-release 16).

In a second aspect of the present disclosure, an SMF of the mobile network may be configured to manage one or more sessions of a UPF which is operative to forward traffic for a voice or data service between one or more UEs in the mobile network and an application or control function of a network. The SMF may invoke a failure detection monitoring procedure for monitoring the application or control function associated with address information which is stored at the SMF. In the failure detection monitoring procedure, the SMF may receive, from an NRF, a message comprising a notification or response which indicates a failure of the application or control function of the network. Based on receiving the message comprising the notification or response which indicates the failure, the SMF may initiate an address list update procedure for a reselection of a new application or control function for the voice or data service by the one or more UEs. The one or more UEs may be a plurality of UEs which are updated with new address information for the voice or data service. In some implementations, invoking the failure detection monitoring procedure may involve subscribing to notifications of the NRF based on the address information for identifying failure of the application or control function. In other implementations, invoking the failure detection monitoring procedure may involve initiating a regular sending, to the NRF, of a message which indicates a request for information associated with the application or control function for identifying failure of the application or control function. According to the second aspect, the SMF which performs the failure detection monitoring procedure may be configured for use in the mobile network which interconnects to the IMS network via the SBI with the eSBA support (e.g. 3GPP Release 16).

In a third aspect of the present disclosure, an SMF may maintain access to stored information for a plurality of selected application or control functions, including stored associations between a plurality of address informations of the selected application or control functions and a respective plurality of capability indications associated with the selected application or control functions. The SMF may invoke one of a first or a second type of failure detection monitoring procedure for a given one of the selected application or control functions based on a respective one of the capability indications associated therewith. In some implementations, the SMF may obtain a capability indication associated with address information of an application or control function which is stored at the SMF. If the capability indication indicates a first type of capability, the SMF may invoke the first type of failure detection monitoring procedure for monitoring the application or control function. On the other hand, if the capability indication indicates a second type of capability, the SMF may invoke the second type of failure detection monitoring procedure for monitoring the application or control function. In some implementations, the first type of failure detection monitoring procedure may be for use in a mobile network which interconnects to the IMS network via the SBI with the eSBA support (e.g. 3GPP Release 16). The second type of failure detection monitoring procedure may be for use in a mobile network which interconnects to the IMS network via a Diameter Rx interface or an SBI without eSBA support (e.g. 3GPP Pre-release 16).

Again, an SMF may maintain access to stored information for a plurality of selected application or control functions, and these selected application or control functions may include first and second application or control functions. In some preferred implementations of the third aspect, the SMF may invoke the first type of failure detection monitoring procedure for monitoring the first application or control function of a first network associated with first address information which is stored at the SMF. In the first type of failure detection monitoring procedure, the SMF may receive, from the NRF, a message comprising a notification or response which indicates a failure of the first application or control function of the first network. Based on receiving the message comprising the notification or response which indicates the failure, the SMF may initiate a first address list update procedure for a reselection of a first new application or control function for the voice or data service. The one or more UEs may be a plurality of UEs which are updated with new address information for the voice or data service. In some implementations, invoking the first type of failure detection monitoring procedure may involve subscribing to notifications of the NRF based on the first address information for identifying failure of the first application or control function. In other implementations, invoking the first type of failure detection monitoring procedure may involve initiating a regular sending, to the NRF, of a message which indicates a request for information associated with the first application or control function for identifying failure of the first application or control function. Also in the third aspect, the SMF may invoke the second type of failure detection monitoring procedure for monitoring the second application or control function of a second network associated with second address information which is stored at the SMF. Here, invoking the second type of failure detection monitoring procedure may involve sending, to the UPF, a message for configuring the second address information of the second application or control function in the UPF, so that the UPF is enabled to regularly perform a ping procedure (or health check procedure) with the second application or control function using the second address information. In the second type of failure detection monitoring procedure, the SMF may receive, from the UPF, a message for reporting a failure of the second application or control function. Based on receiving the message for reporting the failure, the SMF may initiate initiating a second address list update procedure for a reselection of a second new application or control function of the second network for the voice or data service. The one or more UEs may be a plurality of UEs which are updated with new address information for the voice or data service. In some implementations, the ping procedure may involve sending a SIP OPTIONS message to query for operational status of the second application or control function. In other implementations, the ping procedure may involve sending an ICMP echo request message to the second application or control function.

More detailed and alternative techniques and implementations are provided herein as described below.

EXAMPLE EMBODIMENTS

Techniques and mechanisms for Fifth Generation (5G) System (5GS) monitoring and detection of failure of a Proxy-Call Session Control Function (P-CSCF) of an IP Multimedia System (IMS) for efficient restoration of IMS service for multiple mobile devices are described herein. Other more detailed and alternative techniques and mechanisms of the present disclosure are described herein as well.

In some implementations of the present disclosure, a failure detection monitoring procedure may be compatible with the Third Generation Partnership Project (3GPP) Pre-Release 16 standard for 5G to support a Legacy Diameter Rx interface or a Service-Based Interface (SBI) without enhanced Service-Based Architecture (eSBA) support. With this failure detection monitoring procedure (e.g. with corresponding inventive method, mechanism, network element, and/or system), the 5GS monitoring and detection of failure of a P-CSCF may involve a session management function (SMF) programming of a user plane function (UPF) for UPF monitoring of the P-CSCF, using a ping procedure (or health check procedure), for (e.g. a more proactive) restoration of service for multiple mobile devices in response to P-CSCF failure. The ping procedure may involve a Session Initiation Protocol (SIP) OPTIONS ping or an Internet Control Message Protocol (ICMP) ping.

In other implementations of the present disclosure, a failure detection monitoring procedure may be compatible with 3GPP Release 16 standard for 5G to support SBI with eSBA support in both the 5G Core and the IMS core. With this failure detection monitoring procedure (e.g. with corresponding inventive method, mechanism, network element, and/or system), the 5GS monitoring and detection of failure of a P-CSCF may involve SMF monitoring of a P-CSCF via a Network Function (NF) Repository Function (NRF), using a subscription-notification or a request-response mechanism, for (e.g. a more proactive) restoration of service for multiple mobile devices in response to P-CSCF failure.

In yet other implementations of the present disclosure, the failure detection monitoring procedures may be utilized for compatibility with both 3GPP Pre-Release 16 and 3GPP Release 16 standards for 5G. With these failure detection monitoring procedures (e.g. with corresponding inventive method, mechanism, network element, or system), the 5GS monitoring and detection of failure of a P-CSCF may involve detection or identification of a capability associated with the P-CSCF (e.g. one of the 3GPP Pre-Release 16 or 3GPP Release 16 standard) and performance of the appropriate failure detection monitoring based on the detection or identification.

To better illustrate, FIG. 1A is an illustrative representation of a general network architecture 100A of a 5G network. Network architecture 100A includes common control network functions (CCNF) 105 and a plurality of slice-specific core network functions 106. With network architecture 100A, the 5G network may be configured to facilitate communications for a UE 102. UE 102 may obtain access to the 5G network via a radio access network (RAN) or a Next Generation (NG) RAN (NG-RAN) 104. NG-RAN 104 may include one or more base stations or gNodeBs (gNBs), such as a gNB 107. UE 102 may be any suitable type of device, such as a cellular telephone, a smart phone, a tablet device, an Internet of Things (IoT) device, a Machine-to-Machine (M2M) device, and a sensor, to name but a few.

Network architecture 100A of the 5G network includes an SBA which may provide a modular framework from which common applications can be deployed using components of varying sources and suppliers. The SBA of the 5G network may be configured such that control plane functionality and common data repositories are provided by way of a set of interconnected NFs, each with authorization to access each other's services.

Accordingly, CCNF 105 includes a plurality of NFs which commonly support all sessions for UE 102. UE 102 may be connected to and served by a single CCNF 105 at a time, although multiple sessions of UE 102 may be served by different slice-specific core network functions 106. CCNF 105 may include, for example, an Access and Mobility Management Function (AMF) and a Network Slice Selection Function (NSSF). UE-level mobility management, authentication, and network slice instance selection are examples of functionalities provided by CCNF 105. On the other hand, slice-specific core network functions 106 of the network slices may be separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, an SMF, whereas UP NFs 110 may include, for example, a UPF.

Figure 1B:
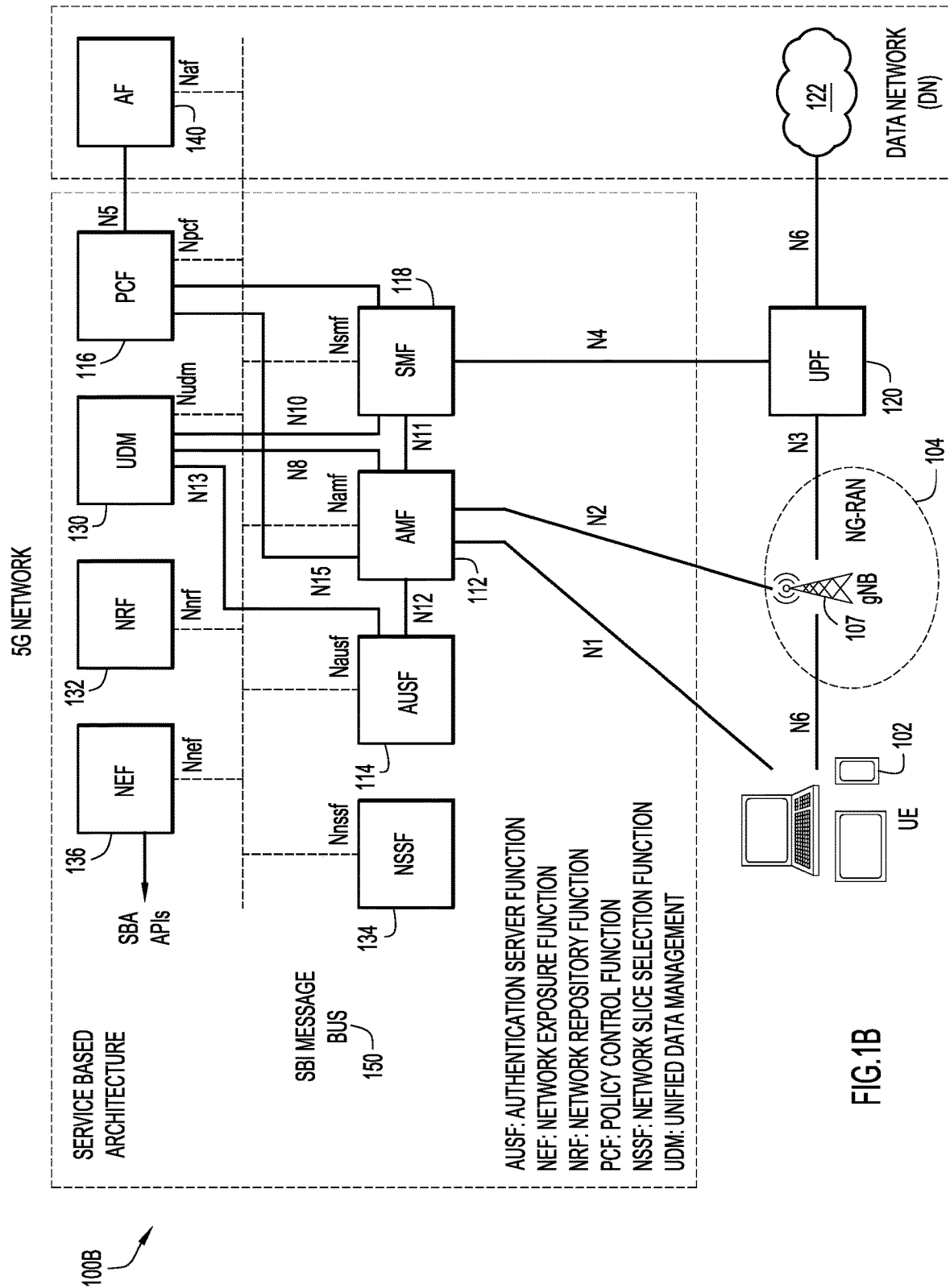
FIG. 1B is an illustrative representation of a more detailed network architecture of the 5G network of FIG. 1A, showing a Service-Based Architecture (SBA) or an enhanced SBA (eSBA) of the 5G network.

FIG. 1B is an illustrative representation of a more detailed network architecture 100B of the 5G network of FIG. 1A. As provided in 3GPP standards for 5G (e.g. 3GPP Technical Specifications or "TS" 23.501 and 23.502), network architecture 100B for the 5G network may include an AMF 112, an Authentication Server Function (AUSF) 114, a Policy Control Function (PCF) 116, an SMF 118, and a UPF 120 which may connect to a Data Network (DN) 122. Other NFs in the 5G network include an NSSF 134, a network exposure function (NEF) 136, an NRF 132, and a Unified Data Management (UDM) function 130. A plurality of interfaces and/or reference points N1-N8, N10-N13, and N15 shown in FIG. 1B (as well as others) may define the communications and/or protocols between each of the entities, as described in the relevant (evolving) standards documents.

In FIG. 1B, UPF 120 is part of the user plane and all other NFs (i.e. AMF 112, AUSF 114, PCF 116, SMF 118, and UDM 130) are part of the control plane. UPF 120 may carry data traffic in a session for UE 102 which is managed by SMF 118 over an N4 interface using a Packet Forwarding Control Protocol (PFCP). Separation of user and control planes guarantees that each plane resource may be scaled independently. It also allows UPFs to be deployed separately from CP functions in a distributed fashion. The NFs in the CP are modularized functions; for example, AMF 112 and SMF 118 may be independent functions allowing for independent evolution and scaling.

The SBA of the 5G network is better illustrated in FIG. 1B, again whereby the control plane functionality and common data repositories are provided by way of the set of interconnected NFs. Assuming the role of either service consumer or service producer, NFs may be self-contained, independent and reusable. With the SBA, each NF service may expose its functionality through an SBI message bus 150. SBI message bus 150 may employ a Representational State Transfer (REST) interface (e.g. using Hypertext Transfer Protocol or "HTTP"/2). As indicated in FIG. 1B, the SBI interfaces of SBI message bus 150 may include an Namf for AMF 112, an Nausf for AUSF 114, an Npcf for PCF 116, an Nsmf for SMF 118, an Nudm for UDM 130, an Nnrf for NRF 132, an Nnssf for NSSF 134, an Nnef for NEF 136, and an Naf for AF 140.

Network slicing brings a high degree of deployment flexibility and efficient resource utilization when deploying diverse network services and applications. NSSF 134 may facilitate network slicing in the 5G network, as it operates to select network slice instances (NSIs) for UEs. A logical, end-to-end network slice may have predetermined capabilities, traffic characteristics, and service level agreements (SLAs), and may include the virtualized resources required to service the needs of a Mobile Virtual Network Operator (MVNO) or group of subscribers, including a dedicated UPF 120, SMF 118, and PCF 116.

UDM 130 may provide services to SBA functions, such as AMF 112, SMF 118 and NEF 136. UDM 130 is typically recognized as a stateful message store, holding information in its local memory. Alternatively, UDM 130 may be stateless, storing information externally within a Unified Data Repository (UDR). UDM 130 may be considered to be analogous to a Home Subscriber Server (HSS), providing authentication credentials while being employed by AMF 112 and SMF 118 to retrieve subscriber data and context.

One or more application functions, such as an Application Function (AF) 140 may connect to the 5G network. AF 140 may interact with the network via NEF 136 in order to access network capabilities. NEF 136 may securely expose network capabilities and events provided by NFs to AF 140, and may provide a means for AF 140 to securely provide information to the 5G network.

An NF instance is an identifiable instance of an NF. In general, NRF 132 may maintain NF profiles of available NF instances and their associated services, and support a service discovery function for service discovery associated with the NF profiles. NF profiles of NF instances maintained in NRF 132 may include NF instance ID, NF type (e.g. AMF, SMF, PCR, UPF, etc.), network slice identifiers such as NSI ID, NF capacity information, names of supported services, etc. For service discovery, NRF 132 may receive a discovery request from an NF instance and provide information associated with the discovered NF instance to the NF instance in response.

An eSBA architecture is defined in 3GPP TS 23.501 for Release 16 (see e.g. 3GPP TS 23.501, version 16.5.1 Release 16, 2020-08). The eSBA architecture introduces what are referred to as an NF Set and an NF Service Set. An NF Set is a group of interchangeable NF instances of the same type, supporting the same services and the same network slice. The NF instances of the same NF Set may be geographically distributed but have access to the same context data. On the other hand, an NF service is a functionality exposed by an NF through the SBI and consumed by other authorized NFs. An NF service instance is an identifiable instance of an NF service, and an NF service operation is an elementary unit that an NF service is composed of. An NF Service Set is a group of interchangeable NF service instances of the same service type within an NF instance. The NF service instances in the same NF Service Set have access to the same context data.

Figure 1C:
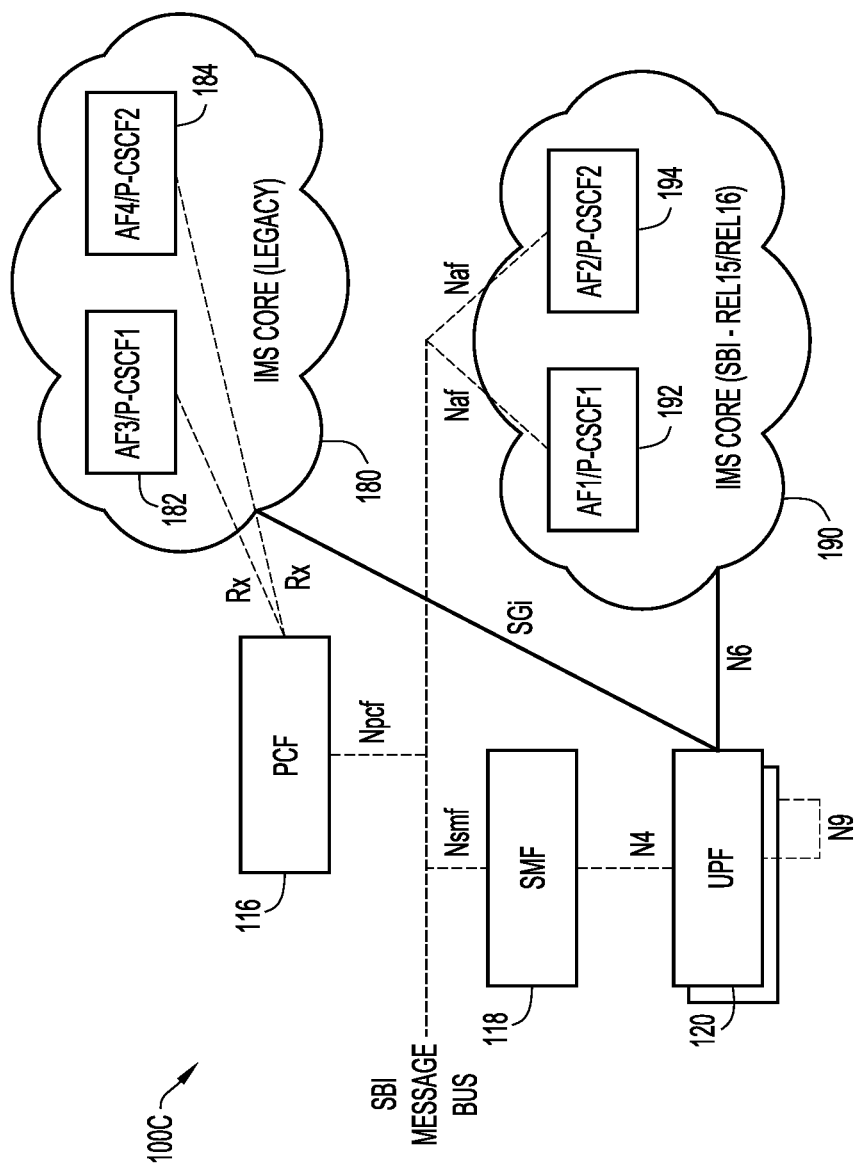
FIG. 1C is an illustration of a network architecture including one or more IP Multimedia Subsystem (IMS) networks that may interconnect with the 5G network of FIG. 1B.

FIG. 1C is an illustration of a network architecture 100C including one or more IMS networks 180 and 190 that may interconnect with the 5G network of FIG. 1B. More particularly, the 5G network may interconnect with IMS network 190 which is an SBI-compatible IMS network having an IMS core and one or more application or control functions. The one or more application or control functions of IMS network 190 may include an AF-1/P-CSCF-1 192 and an AF-2/P-CSCF-2 194. In addition, or in the alternative, the 5G network may interconnect to IMS network 180 which is a legacy IMS network having an IMS core and one or more application or control functions. The one or more application or control functions of IMS network 180 may include an AF-3/P-CSCF-3 182 and an AF-4/P-CSCF-4 184.

A P-CSCF is an IMS core component that performs IMS signaling processing for IMS services. To establish service, a UE may receive an address of the P-CSCF in a message which includes a Protocol Configuration Options (ePCO) container. During operation, the P-CSCF may fail and, as a result, service may become unavailable. However, a service provider (SP) should expect that failures of IMS components/instances are quickly detected by the 5G core, for proactive restoration of services to all impacted voice or video call users—not merely a reactive restoration of service for a single user at a time. Also, when a P-CSCF or P-CSCF service fails, it is possible that a failed or inaccessible P-CSCF would be included in an updated address list and sent to UEs during IMS Packet Data Unit (PDU) session setups (e.g. for new calls or as part of IMS restoration procedures). Further, if the P-CSCF fails after a PDU session is established, there is no current methodology to notify the UE about the failure of the P-CSCF until the UE initiates an IMS call (e.g. a UE-originated or terminated call). These issues would downgrade Key Performance Indicators (KPIs) for SIP and overall communication services served through the IMS PDU session.

Accordingly, techniques and mechanisms for 5GS monitoring and detection of failure of a P-CSCF of an IMS for efficient restoration of IMS service for multiple mobile devices are described herein. In some architecture configurations, IMS networks 180 and 190 may be 3GPP Pre-Release 16 compliant (e.g. Legacy Diameter Rx interface based, or Release 15 SBI based but without eSBA support) which may involve UPF-based failure detection monitoring according to the present disclosure. In other architecture configurations, IMS network 190 may be 3GPP Release 16 compliant (e.g. Release 16 SBI-based with eSBA support in both 5G Core and IMS core) which may involve SMF-based failure detection monitoring according to the present disclosure.

What is now described is a type of procedure involving a UPF-based failure detection monitoring (e.g. 3GPP Pre-Release 16 compliant; Legacy Diameter Rx interface based, or Release 15 SBI based but without eSBA support).

Figure 2:
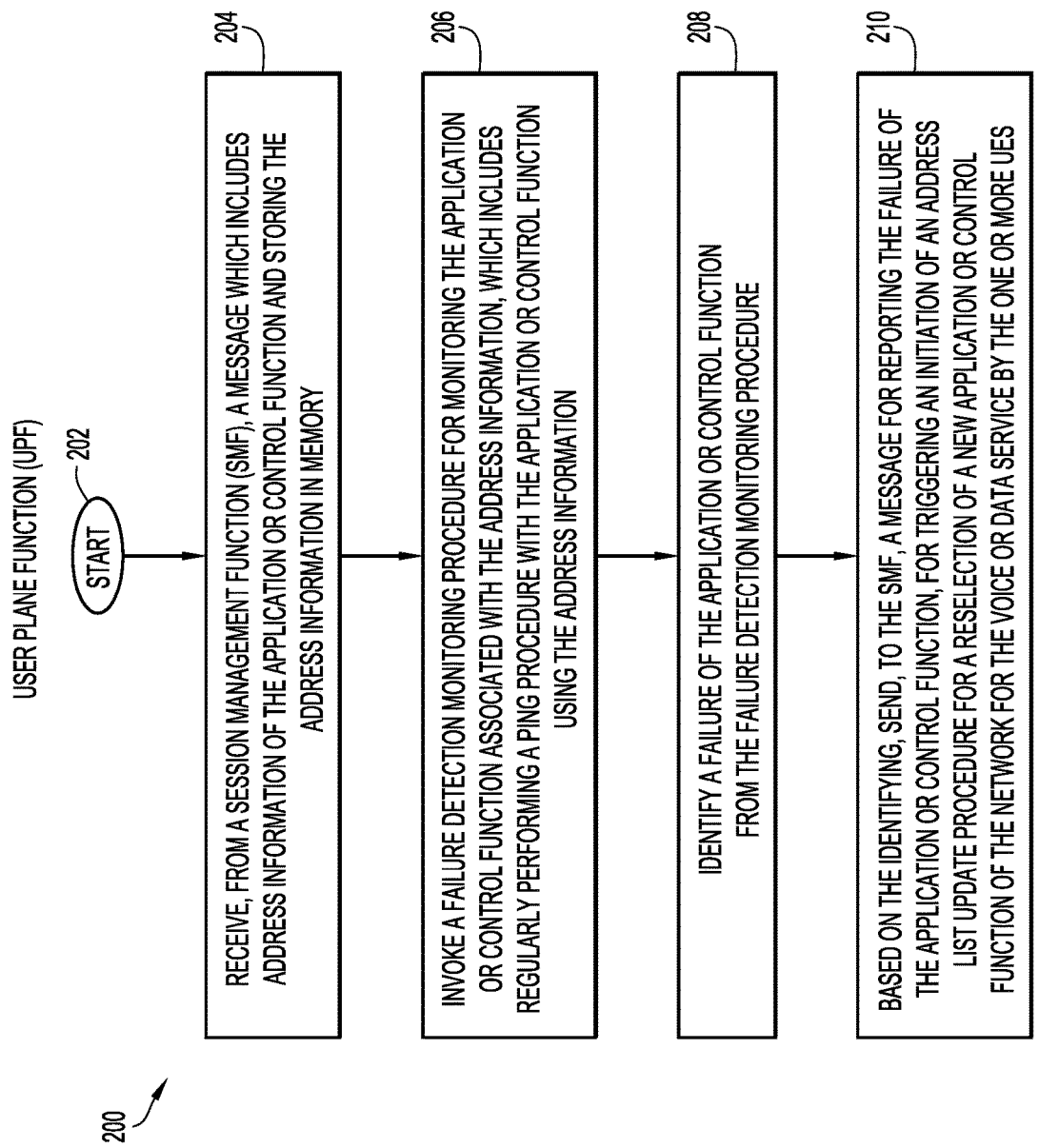
FIG. 2 is a flowchart for describing a method of failure detection monitoring of an application or control function for efficient service restoration according to some implementations of the present disclosure (e.g. for 3GPP Pre-Release 16)

FIG. 2 is a flowchart 200 for describing a method for use in failure detection monitoring of an application or control function for efficient service restoration according to some implementations of the present disclosure. The method of FIG. 2 involves a UPF-based failure detection monitoring which may be performed in relation to application or control functions in networks based on 3GPP Pre-release 16, Legacy Diameter Rx interface or SBI without eSBA support. The method of FIG. 2 may be performed by a computing device or a network node configured to connect in a network for communication. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as a UPF.

In particular, the method of FIG. 2 may be performed by a UPF which is configured to forward traffic for a voice or data service between one or more UEs operative in the mobile network and an application or control function of a network. Beginning at a start block 202, the UPF may receive, from the SMF, a message which includes address information of the application or control function and store the address information in memory (step 204 of FIG. 2). The UPF may invoke a failure detection monitoring procedure for monitoring the application or control function associated with the address information (step 206 of FIG. 2). The failure detection monitoring procedure may include regularly performing a ping procedure (or health check procedure) with the application or control function using the address information. In some implementations, the ping procedure may involve sending a SIP OPTIONS message to query for operational status of the application or control function. In other implementations, the ping procedure may involve sending an ICMP echo request message to the application or control function. Sometime during operation, the UPF may identify a failure of the application or control function from the failure detection monitoring procedure (step 208 of FIG. 2). Based on the identifying, the UPF may send, to the SMF, a message for reporting the failure of the application or control function (step 210 of FIG. 2). The message for reporting the failure may be for triggering an initiation of an address list update procedure for a reselection of a new application or control function of the network for the voice or data service by the one or more UEs. Thus, in some implementations, the restoration procedure may be triggered for all users associated with a particular application or control function that was detected to have failed or become inaccessible.

Figure 3:
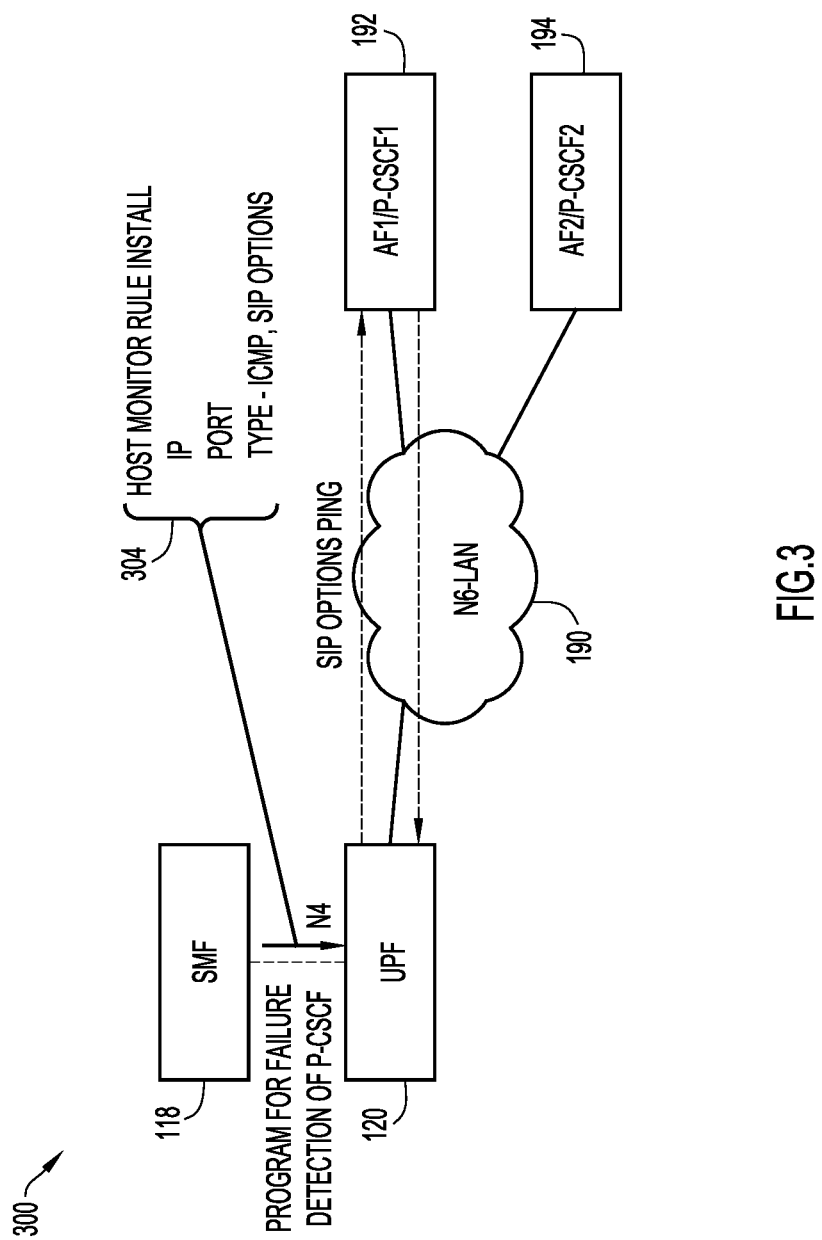
FIG. 3 is an illustration of a network node arrangement involving a message flow for describing failure detection monitoring of an application or control function for efficient restoration according to some implementations (e.g. for 3GPP Pre-Release 16)

FIG. 3 is an illustrative representation of a network node arrangement 300 with a message flow for describing failure detection monitoring of an application or control function for efficient restoration according to some implementations. As shown in FIG. 3, SMF 118 may send to UPF 120 a message which includes address information of P-CSCF-1 192. UPF 120 may receive the message which includes the address information and store the address information in association with a rule for monitoring ("host monitor rule install"). In some implementations, the address information may include an IP address, a port number, and a protocol type (e.g. a first or a second protocol type, or ICMP or SIP OPTIONS type). In response, UPF 120 may invoke a failure detection monitoring procedure for monitoring the P-CSCF-1 192. As shown, UPF 120 may perform the failure detection monitoring procedure which includes a regularly performing of a ping procedure (or health check procedure) with the P-CSCF-1 192 using the address information. Here, a SIP OPTIONS ping may be used for checking the health of the SIP service or process within the P-CSCF node of the IMS core, and a ICMP-based ping may be used generally to check if the P-CSCF node is alive or not. In the example of FIG. 3, UPF 120 may utilize a light-weight SIP protocol stub to monitor the operational status of the SIP service/process of P-CSCF-1 192.

Figure 4:
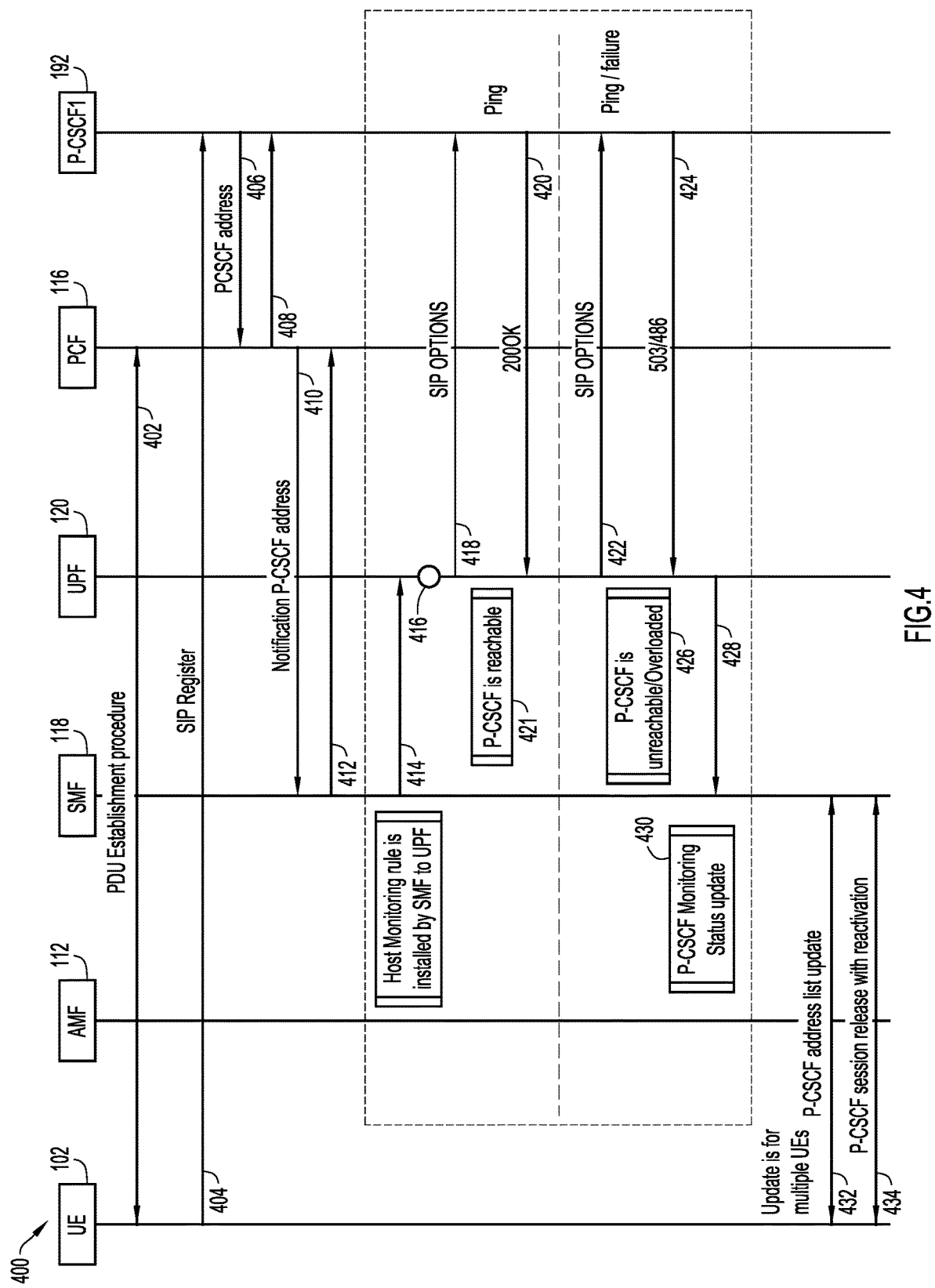
FIG. 4 is a call flow diagram for describing a call flow for failure detection monitoring of an application or control function for efficient service restoration according to some implementations of the present disclosure (e.g. for 3GPP Pre-Release 16)

FIG. 4 is a call flow diagram 400 for describing a call flow for failure detection monitoring of an application or control function for efficient service restoration according to some implementations. The call flow of FIG. 4 may involve the UPF-based failure detection monitoring of FIGS. 2-3, performed in relation to application or control functions in networks based on 3GPP Pre-release 16, Legacy Diameter Rx interface or SBI without eSBA support. In FIG. 4, UE 102 may send a message for registration in the mobile network and establish a PDU session via a PDU establishment procedure (step 402 of FIG. 4). UE 102 has address information, stored in memory, associated with a P-CSCF for an IMS service. Using the address information, UE 102 may send to P-CSCF-1 192 a message for SIP registration (step 404 of FIG. 4). P-CSCF-1 192 may then send to PCF 116 a message which includes the address information of P-CSCF-1 192 (step 406 of FIG. 4) and PCF 116 sends a response back to P-CSCF-1 192 for acknowledgement (step 408 of FIG. 4). PCF 116 may send to SMF 118 a message which includes a notification of the address information of P-CSCF-1 192 (step 410 of FIG. 4) and SMF 118 sends a response back to PCF 116 for acknowledgement (step 412 of FIG. 4).

SMF 118 may then send to UPF 120 a message which includes address information of P-CSCF-1 192 (step 414 of FIG. 4). UPF 120 may receive the message which includes the address information and store the address information in association with a rule for monitoring ("Host Monitoring rule is installed"). In some implementations, the address information may include an IP address, a port number, and a type (e.g. a first or a second protocol type, or an ICMP or SIP OPTIONS type). In response, UPF 120 may invoke a failure detection monitoring procedure for monitoring the P-CSCF-1 192 (step 416 of FIG. 4). As shown, UPF 120 may perform the failure detection monitoring procedure which includes a regular or periodic performing of a ping procedure (or health check procedure) (e.g. a SIP OPTIONS ping) with the P-CSCF-1 192 using the address information (steps 418 and 420 of FIG. 4). Here, UPF 120 may utilize a timer for the regular or periodic performing the ping procedure (or health check procedure).

In some implementations, UPF 120 may carry a lightweight SIP protocol stub to perform the SIP OPTIONS ping or a mechanism for an ICMP ping reachability check to monitor the operational status of the service. In particular implementations, the ping procedure may utilize SIP OPTIONS ping which is based on P. Jones, Internet Draft, "Using OPTIONS to Query for Operation Status in the Session Initiation Protocol (SIP)," draft-jones-sip-options-ping-01.txt, May 4, 2010.

Here, in step 418, UPF 120 may send a SIP OPTIONS message to query for operational status of P-CSCF-1 192. In step 420, when the service of P-CSCF-1 192 is available, P-CSCF-1 192 may send back to UPF 120 a 200 OK message, where UPF 120 detects that P-CSCF-1 192 is reachable (step 421 of FIG. 4). On the other hand, UPF 120 may send a SIP OPTIONS message to query for operational status of P-CSCF-1 192 (step 422 of FIG. 4) and, when the service of P-CSCF-1 192 is unavailable, P-CSCF-1 192 may send back to UPF 120 a message with a response code of 503 or 486 (step 424 of FIG. 4), where UPF 120 detects that P-CSCF-1 192 is unreachable (step 426 of FIG. 4).

UPF 120 may employ a monitoring status update procedure (step 430 of FIG. 4) to report host availability status and/or loss status to SMF 118. Such a procedure may be or include a regular or periodic reporting or, alternatively, a detection-triggered based reporting. Here, UPF 120 may send to SMF 118 a message for reporting the failure/loss status of the P-CSCF-1 192 (step 428 of FIG. 4). The message may be used for triggering an initiation of an address list update procedure with UE 102 and other UEs (step 432 of FIG. 4), for a reselection of a new P-CSCF for the service by UE 102 as well as the other UEs. The reselection may be performed with use of a procedure for session release with reactivation (step 434 of FIG. 4).

Thus, in some implementations, the restoration procedure may be triggered for all users associated with a particular P-CSCF that was detected to have failed or become inaccessible. When P-CSCF failure is detected, SMF 118 may refrain from sending the failed P-CSCF address to UE 102 and other UEs. In some implementations, SMF 118 may use restoration procedures based on 3GPP TS 23.380, Section 5.8.3.2, to send a new P-CSCF address to all UEs that are using UPF 120 that reported the P-CSCF service failure. Although this is a failure detection for a single UE 102, the restoration action may be triggered for all UEs associated with that UPF 120 with the failed P-CSCF. This may therefore be considered to be a proactive IMS service recovery operation that is achieved for multiple UEs. In alternative implementations, SMF 118 may refrain from utilizing UPF 120 (e.g. isolate it) for a new IMS, DNN based PDU session. Even further, SMF 118 may switch (the anchor) UPF 120 for the sessions or force reactivation of IMS PDU session.

Note that 3GPP TS 29.244 (e.g. V16.6.0 (2020-12)), "Interface between the Control Plane and the User Plane nodes," specifies the PFCP used on the interface between the CP function (e.g. the SMF) and the UP function (e.g. the UPF). In some implementations of the present disclosure, new features and information elements (IEs) may be defined in relation to the PFCP protocol stack (e.g. in relation to programming the UPF by the SMF, and/or in relation to UPF reporting of P-CSCF failure to the SMF).

In some implementations, a new feature in the CP Function Features of Section 8.2.58 of 3GPP TS 29.244 may be defined. This new feature may be referred to as an application function path status reporting (AFPSR) feature. In specific implementations that impact Table 8.2.58-1 of Section 8.2.58, the AFPSR may be associated with "Feature Octet/Bit=6/x", "Interface=Sxb, N4", and a description that the CP function supports the AF path Status Reporting feature, i.e. the receiving and handling of an AF path status Information IE (see clause 7.4.4.x).

In some implementations, a new feature in the UP Function Features of Section 8.2.25 of 3GPP TS 29.244 may be defined. This new feature may also be referred to as the AFPSR feature. In specific implementations that impact Table 8.2.25-1 of Section 8.2.25, the AFPSR feature may be associated with "Feature Octet/Bit=10/x", "Interface=Sxb, N4", and a description that the UP function supports performing a reachability test towards the application function and report the path status to the CP function.

In some implementations, a new information element in a PFCP Association Update Request of 3GPP TS 29.244 may be provided. This new information element may be referred to as an AF Path Information IE. In specific implementations that impact Table 7.4.4.3-1, the AF Path Information IE may be associated with "P=O" and a condition/comment that the CP function may include it if both UP and CP functions support the AF path failure report feature; several IEs with same type may be present to represent path information of multiple application functions. For the PFCP Association Update Request, in a Section 7.4.4.3.x of 3GPP TS 29.244, the AF path information grouped IE may be encoded as shown in the following Table 1.

TABLE 1

AF Path Information IE within PFCP Association Update Request

| Octets 1 and 2 | | AF Path Information IE Type = xxx (decimal) | | | | | |
| Octets 3 and 4 | | Length = n | | | | | |
| Information elements | P | Condition/Comment | Sxa | Appl. Sxb | Sxc | N4 | IE Type |
| AF IP Address | M | This IE shall contain an IPv4 and/or IPv6 address of an application function needs to be monitored. | — | X | — | X | AF IP Address |
| Path Information | M | This IE shall be included to indicate the application/ transport protocol, monitoring and path status of the application function | — | X | — | X | Path Information |

In some implementations, a new information element in a PFCP Association Update Response of 3GPP TS 29.244 may be provided. This new information element may also be referred to as the AF Path Information IE. In specific implementations that impact Table 7.4.4.4-1, the AF Path Information IE may again be associated with "P=O" and a condition/comment that the CP function may include it if both UP and CP functions support the AF path failure report feature; several IEs with same type may be present to represent path information of multiple application functions. For the PFCP Association Update Response, in Section 7.4.4.4.x of 3GPP TS 29.244, the AF path information grouped IE may be encoded as shown in the following Table 2.

TABLE 2

AF Path Information IE within PFCP Association Update Response

Octets 1 and 2    AF Path Information IE Type = xxx (decimal)
Octets 3 and 4               Length = n

| Information elements | P | Condition/Comment | Sxa | Appl. Sxb | Sxc | N4 | IE Type |
|---|---|---|---|---|---|---|---|
| AF IP Address | M | This IE shall contain an IPv4 and/or IPv6 address of an application function needs to be monitored. | — | X | — | X | AF IP Address |
| Path Information | M | This IE shall be included to indicate the application/transport protocol, monitoring and path status of the application function. | — | X | — | X | Path Information |

In some implementations, a new information element in a PFCP Node Report Request of 3GPP TS 29.244 may be provided. This new information element may also be referred to as the AF Path Information IE. In specific implementations that impact Table 7.4.5.1.1-1, the AF Path Information IE may again be associated with "P=O" and a condition/comment that the CP function may include it if both UP and CP functions support the AF path failure report feature; several IEs with same type may be present to represent path information of multiple application functions. For the PFCP Node Report Request, in Section 7.4.5.1.1 of 3GPP TS 29.244, the AF path information grouped IE may be encoded as shown below in the Table 3.

TABLE 3

AF Path Information IE within PFCP Node Report Request

Octet 1 and 2    AF Path Information IE Type = xxx (decimal)
Octets 3 and 4               Length = n

| Information elements | P | Condition/Comment | Sxa | Appl. Sxb | Sxc | N4 | IE Type |
|---|---|---|---|---|---|---|---|
| AF IP Address | M | This IE shall contain an IPv4 and/or IPv6 address of an application function needs to be monitored. | — | X | — | X | AF IP Address |
| Path Information | M | This IE shall be included to indicate the application/transport protocol, monitoring and path status of the application function. | — | X | — | X | Path Information |

In some implementations, a new information element in a PFCP Node Report Response of 3GPP TS 29.244 may be provided. This new information element may also be referred to as the AF Path Information IE. In specific implementations that impact Table 7.4.5.1.1-1, the AF Path Information IE may again be associated with "P=O" and a condition/comment that the CP function may include it if both UP and CP functions support the AF path failure report feature; several IEs with same type may be present to represent path information of multiple application functions. In Section 7.4.5.1.1 of 3GPP TS 29.244, the AF path information grouped IE may be encoded as shown in the following Table 4.

TABLE 4

AF Path Information IE within PFCP Node Report Response

Octets 1 and 2    AF Path Information IE Type = xxx (decimal)
Octets 3 and 4              Length = n

| Information elements | P | Condition/Comment | Sxa | Appl. Sxb | Sxc | N4 | IE Type |
|---|---|---|---|---|---|---|---|
| AF IP Address | M | This IE shall contain an IPv4 and/or IPv6 address of an application function needs to be monitored. | — | X | — | X | AF IP Address |
| Path Information | O | This IE shall be included to indicate the application/transport protocol, monitoring and path status of the application function. | — | X | — | X | Path Information |

The AF IP Address IE may contain an IPv4 and/or IPv6 address. It may be encoded as shown below in Table 5.

TABLE 5

AF IP Address

| Octets | Bits | | | | | | | |
|---|---|---|---|---|---|---|---|---|
| | 8 | 7 | 6 | 5 | 4 | 3 | 2 | 1 |
| 1 to 2 | Type = XXX (decimal) | | | | | | | |
| 3 to 4 | Length = n | | | | | | | |
| 5 | Spare | | | | | | V4 | V6 |
| p to (p + 3) | IPv4 Address | | | | | | | |
| q to (q + 15) | IPv6 Address | | | | | | | |
| m to (n + 4) | These octet(s) is/are present only if explicitly specified | | | | | | | |

The following flags are coded within Octet 5:
Bit 1-V6: If this bit is set to "1", then the IPv6 address field may be present in the AF IP Address, otherwise the IPv6 address field shall not be present.
Bit 2-V4: If this bit is set to "1", then the IPv4 address field may be present in the AF IP Address, otherwise the IPv4 address field may not be present.
Bit 3 to 8 Spare, for future use and set to "0".
Octets "p to (p+3)" or "q to (q+15)" (IPv4 address/IPv6 address fields), if present, may contain the address value.

The Path Information IE may be encoded as shown below in Table 6. It may indicate the application function monitoring status or "Monitor" (e.g. whether the Monitor is ON/OFF), the path status or "Path" (e.g. whether the Path is Accessible/Inaccessible), and the protocol type or "Protocol" (e.g. whether the Protocol is ICMP or PING). In some implementations, the Monitor, the Path, and Protocol may be defined as provided below in Tables 6A, 6B, and 6C, respectively.

TABLE 6

Path Information IE

| Octets | Bits | | | | | | | |
|---|---|---|---|---|---|---|---|---|
| | 8 | 7 | 6 | 5 | 4 | 3 | 2 | 1 |
| 1 to 2 | Type = xx (decimal) | | | | | | | |
| 3 to 4 | Length = n | | | | | | | |

TABLE 6-continued

Path Information IE

| Octets | Bits | | | | | | | |
|---|---|---|---|---|---|---|---|---|
| | 8 | 7 | 6 | 5 | 4 | 3 | 2 | 1 |
| 5<br>6 to<br>(n + 4) | Spare | | Monitor | | Path | | | Protocol |
| | These octet(s) is/are present only if explicitly specified | | | | | | | |

TABLE 6A

Monitor

| Monitor | Value (Decimal) |
|---|---|
| NA (Not Applicable) | 0 |
| ON | 1 |
| OFF | 2 |
| For future use. Shall not be sent. If received, shall be interpreted as the value "0". | 3 |

TABLE 6B

Path

| Path | Value (Decimal) |
|---|---|
| NA (Not Applicable) | 0 |
| ACCESSIBLE | 1 |
| INACCESSIBLE | 2 |
| For future use. Shall not be sent. If received, shall be interpreted as the value "1". | 3 |

TABLE 6C

Protocol

| Protocol | Value (Decimal) |
|---|---|
| ICMP | 0 |
| SIP | 1 |
| For future use. Shall not be sent. If received, shall be interpreted as the value "0". | 2, 3 |

What is next described is a type of procedure involving a SMF-based failure detection monitoring (e.g. 3GPP Release 16 compliant; Release 16 SBI-based with eSBA support in both 5G Core and IMS core).

Figure 5A:
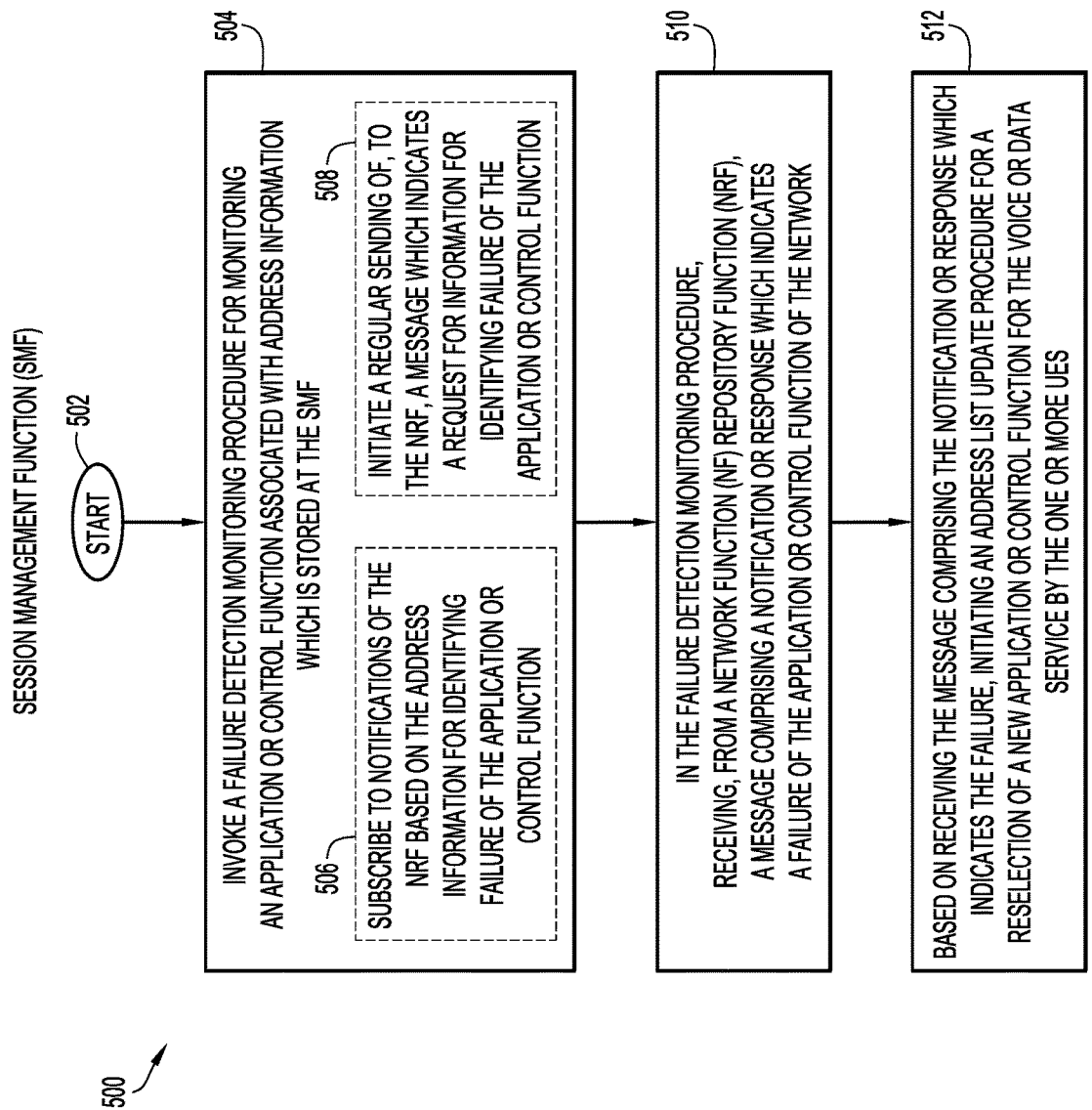
FIG. 5A is a flowchart for describing a method of failure detection monitoring of an application or control function for efficient service restoration according to some implementations of the present disclosure, which may be a first type of failure detection monitoring procedure (e.g. for 3GPP Release 16)

FIG. 5A is a flowchart 500 for describing a method for use in failure detection monitoring of an application or control function for efficient service restoration according to some implementations. The method of FIG. 5A involves an SMF-based failure detection monitoring which may be performed in relation to application or control functions in networks based on 3GPP Release 16, SBI with eSBA support in both the 5G Core and the IMS core. The method of FIG. 5A may be performed by a computing device or a network node configured to connect in a network for communication. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as an SMF.

In particular, the method of FIG. 5A may be performed by an SMF configured to manage one or more sessions of a UPF which is operative to forward traffic for a voice or data service between one or more UEs in the mobile network and an application or control function of a network. Beginning at a start block 502, the SMF may invoke a failure detection monitoring procedure for monitoring the application or control function associated with address information which is stored at the SMF (step 504 of FIG. 5A). In step 504, invoking the failure detection monitoring procedure may involve subscribing to notification of the NRF based on the address for identifying failure of the application or control function (step 506 of FIG. 5A). Alternatively, in step 504, invoking the failure detection monitoring procedure may involve initiating a regular sending of, to the NRF, a message which indicates a request for information associated with the application or control function for identifying failure of the application or control function (step 508 of FIG. 5A); this may be considered to be a dynamic querying of the NRF for status. Here, the SMF may utilize a timer for the regular or periodic querying for the information. In the failure detection monitoring procedure, the SMF may receive, from an NRF, a message comprising a notification or response which indicates a failure of the application or control function of the network (step 510 of FIG. 5A). Based on the receiving the message comprising the notification or response which indicates the failure, the SMF may initiate an address list update procedure for a reselection of a new application or control function of the network for the voice or data service by the one or more UEs (step 512 of FIG. 5A).

The SMF configured to perform the method of FIG. 5A may also control and/or manage the UPF-based failure detection monitoring as described above in relation to FIGS. 2-4 (e.g. for 3GPP Pre-Release 16 compliant; Legacy Diameter Rx interface based, or Release 15 SBI based but without eSBA support), which is now described in relation to FIG. 5B.

FIG. 5B is a flowchart 520 for describing a method for use in failure detection monitoring of an application or control function for efficient service restoration according to some implementations of the present disclosure. The SMF method of FIG. 5B involves the UPF-based failure detection monitoring which may be performed in relation to application or control functions in networks based on 3GPP Pre-release 16, Legacy Diameter Rx interface or SBI without eSBA support. The method of FIG. 5B may be performed by a computing device or a network node configured to connect in a network for communication. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as an SMF.

In particular, the method of FIG. 5B may be performed by an SMF configured to manage one or more sessions of a UPF which is operative to forward traffic for a voice or data service between one or more UEs in the mobile network and an application or control function of a network. Beginning at a start block 522, the SMF may invoke a failure detection monitoring procedure for monitoring the application or control function associated with address information which is stored at the SMF (step 524 of FIG. 5B). In step 524, invoking the failure detection monitoring procedure may involve sending, to the UPF, a message for configuring the second address information of the second application or control function in the UPF, so that the UPF is enabled to regularly perform a ping procedure (or health check procedure) with the second application or control function using the second address information (step 526 of FIG. 5B). In the failure detection monitoring procedure, the SMF may receive, from the UPF, a message for reporting a failure of the second application or control function (step 528 of FIG. 5B). Based on the receiving the message for reporting the failure, the SMF may initiate an address list update procedure for a reselection of a new application or control function of the network for the voice or data service by the one or more UEs (step 530 of FIG. 5B).

Figure 6:
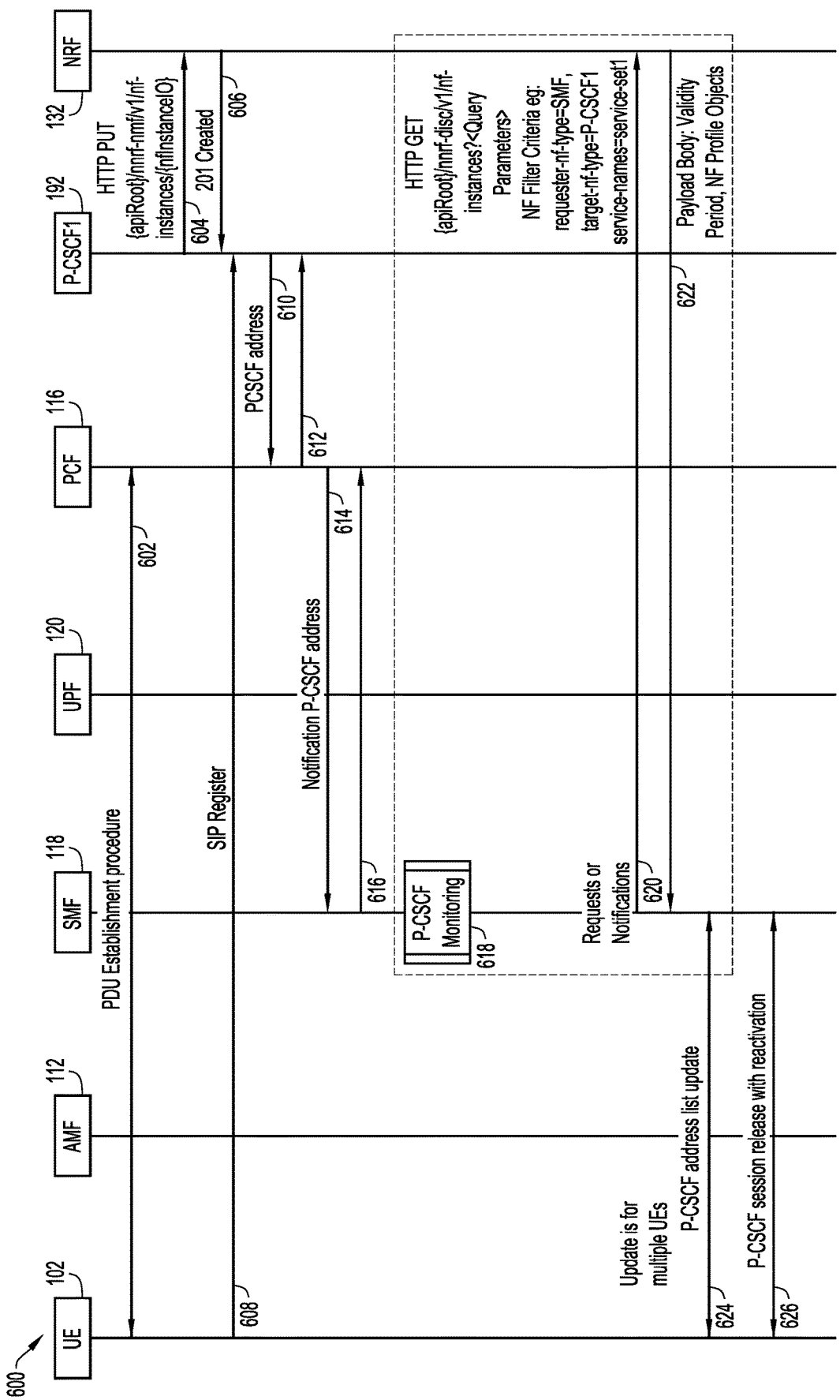
FIG. 6 is a call flow diagram for describing a call flow for failure detection monitoring of an application or control function for efficient service restoration according to some implementations of the present disclosure (e.g. for 3GPP Release 16)

FIG. 6 is a call flow diagram 600 for describing a call flow for failure detection monitoring of an application or control function for efficient service restoration according to some implementations of the present disclosure. The call flow of FIG. 6 may involve the SMF-based failure detection monitoring as described in relation to FIG. 5A, with respect to application or control functions in networks based on 3GPP Release 16, SBI with eSBA support in both the 5G Core and the IMS core. Initially, P-CSCF-1 192 may register with NRF 132 using an HTTP PUT request (step 604 of FIG. 6) which is acknowledged by NRF 132 as created (step 606 of FIG. 6). In addition, SMF 118 may have invoked a failure detection monitoring procedure with respect to P-CSCF-1 192, by subscribing to notifications of NRF 132 based on address information of P-CSCF-1 192, or by initiating a regular sending, to NRF 132, of a message which indicates a request for information associated with P-CSCF-1 192 (e.g. a dynamic querying of NRF 132 for status). Here, SMF 118 may utilize a timer for the regular or periodic querying for the information. In some implementations, P-CSCF registration and subscriptions with NRF 132 may be performed based on the description in relation to FIG. 7A-7B.

In FIG. 6, UE 102 may send a message for registration in the mobile network and establish a PDU session via a PDU establishment procedure (step 602 of FIG. 6). UE 102 has address information, stored in memory, associated with a P-CSCF for an IMS service. Using the address information, UE 102 may send to P-CSCF-1 192 a message for SIP registration for the service (step 608 of FIG. 6). P-CSCF-1 192 may then send to PCF 116 a message which includes the address information of P-CSCF-1 192 (step 610 of FIG. 6), where PCF 116 sends a response back to P-CSCF-1 192 for acknowledgement (step 612 of FIG. 6). PCF 116 may send to SMF 118 a message which includes a notification of the address information of P-CSCF-1 192 (step 614 of FIG. 6), where SMF 118 sends a response back to PCF 116 for acknowledgement (step 616 of FIG. 6).

Again, SMF 118 may have earlier invoked a failure detection monitoring procedure with respect to P-CSCF-1 192 (step 618 of FIG. 6), by subscribing to notifications of NRF 132 based on address information of P-CSCF-1 192, or by initiating a regular sending, to NRF 132, of a message which indicates a request for information associated with P-CSCF-1 192. In any event, SMF 118 may receive from NRF 132 a message comprising a notification or response which indicates a failure of P-CSCF-1 192. In the example of FIG. 6, SMF 118 may send to NRF 132 a message indicating a request for information associated with P-CSCF-1 192 (e.g. a regular, dynamic querying of NRF 132 for status, for example, using a timer) (e.g. using an HTTP GET message) (step 620 of FIG. 6) and may receive from NRF 132 the information associated with P-CSCF-1 192 (step 622 of FIG. 6). The message in step 622 may be a message indicating a response which indicates a failure of P-CSCF-1 192. The message may trigger an initiation of an address list update procedure with UE 102 as well as other UEs (step 624 of FIG. 6), for a reselection of a new P-CSCF for the service by UE 102 as well as the other UEs. The reselection may be performed with use of a procedure for session release with reactivation (step 626 of FIG. 6).

In some implementations of the present disclosure, the SMF may operate to refrain from including address information of a failed P-CSCF in a list within ePCO containers during IMS PDU establishment. Once the P-CSCF is detected to be available again, the SMF may then again offer the address information of the P-CSCF in the ePCO containers for new calls.

In additional or alternative implementations, the SMF may be configured with a retry or guard mechanism which provides one or more retries or delays prior to declaring an P-CSCF to be unavailable or inaccessible. This retry or guard mechanism may operate to retry a P-CSCF, after initial detection of its failure, a predetermined number of times or over a predetermined time period, prior to declaring the P-CSCF to be unavailable or inaccessible.

In other additional or alternative implementations, the SMF may be configured with a blacklisting mechanism for blacklisting a failed P-CSCF for a predetermined time period after detection of its failure. In response to an expiration of the predetermined time period, the SMF may operate to again check for accessibility or operational status of the P-CSCF and, if available, again offer the P-CSCF for new calls.

Figure 7A:
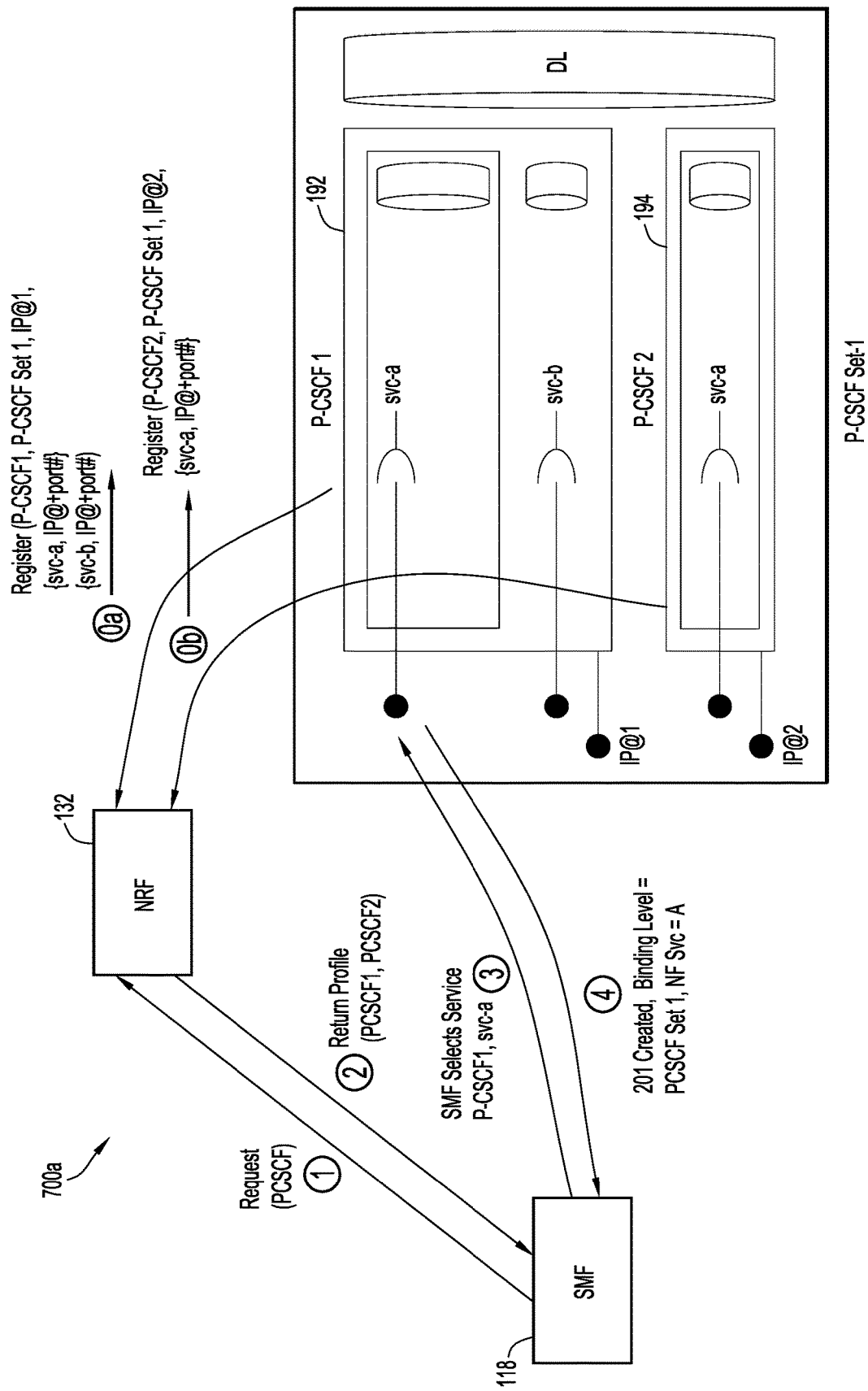
FIGS. 7A-7B are illustrative representations of network node arrangements involving first and second parts of message flows for use in failure detection monitoring of an application or control function according to some implementations of the present disclosure (e.g. for 3GPP Release 16)
Figure 7B:
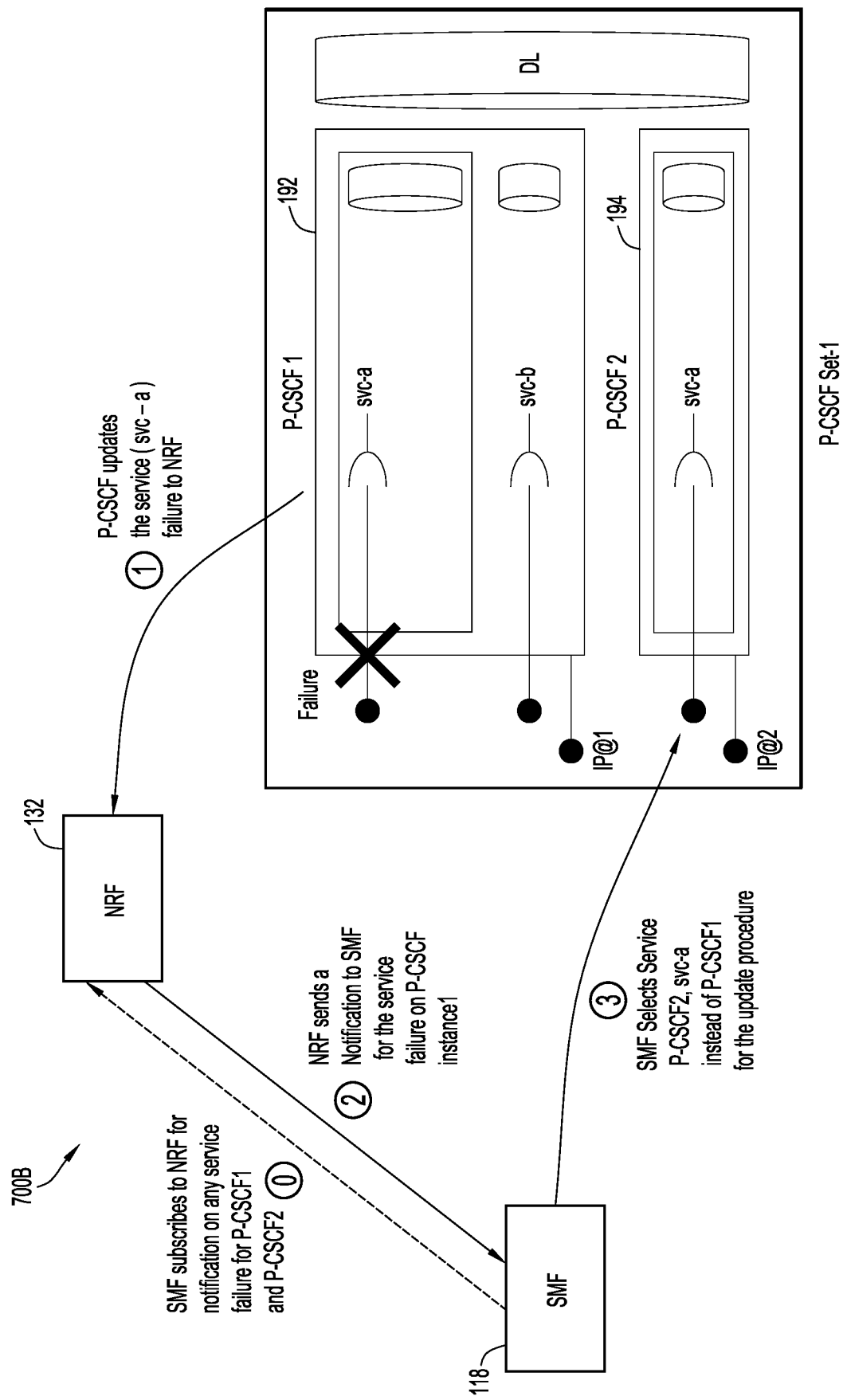

FIGS. 7A-7B are illustrative representations of network node arrangements with first and second parts of message flows for use in failure detection monitoring of an application or control function according to some implementations of the present disclosure (e.g. for 3GPP Release 16), which may be used in relation to the SMF-based failure detection monitoring in FIG. 5A and/or the call flow of FIG. 6.

FIG. 7A is an illustrative representation of a network node arrangement 700 involving a first part of a message flow (e.g. NRF registration and SMF-PCSCF binding) for use in failure detection monitoring of an application or control function according to some implementations of the present disclosure. The first part of the message flow may be performed prior to invoking the failure detection monitoring. Initially, P-CSCF-1 192 and P-CSCF-2 194 of the same set (e.g. P-CSCF Set 1) may register with NRF 132 with address information. Specifically, P-CSCF-1 192 may register with NRF 132, indicating a P-CSCF Set 1 and an IP address 1, as well as a Service A (svc-a) with associated address information (e.g. an IP address and port number) and a Service B (svc-b) with associated address information (e.g. an IP address and port number) (step 0a of FIG. 7A). In addition, P-CSCF-2 194 may register with NRF 132, indicating the P-CSCF Set 1 and an IP address 2, as well as the Service A (svc-a) with the associated address information (step 0b of FIG. 7A). After P-CSCF registration with NRF 132, SMF 118 may send to NRF 132 a message indicating a request for profile information for the P-CSCFs (step 1 of FIG. 7A). NRF 132 may send back to SMF 118 a message indicating a response which includes the profile information of P-CSCF-1 192 and P-CSCF-2 194 (step 2 of FIG. 7A). SMF 118 may select the Service A (svc-a) of P-CSCF-1 192, and send to NRF 132 a message indicating a binding indication for the Service A (svc-a) of P-CSCF-1 192 of Set 1 (step 3 of FIG. 7A). NRF 132 may send back to SMF 118 a message indicating a response which confirms creation of the binding (step 4 of FIG. 7A).

FIG. 7B is an illustrative representation of the network node arrangement 700 of FIG. 7A involving a second part of the message flow (e.g. SMF detection of P-CSCF failure) for use in the failure detection monitoring of the application of control function according to some implementations of the present disclosure. The second part of the message flow involves the invoking of the failure detection monitoring and the P-CSCF failure detection. After NRF registration and SMF-PCSCF binding, SMF 118 may send to NRF 132 a request for subscribing to notifications of NRF 132 based on the address information, for identifying any service failure of P-CSCF-1 192 and P-CSCF-2 194 (step 0 of FIG. 7B). Sometime during operation, P-CSCF-1 192 may experience a service failure and NRF 132 may identify this service failure (step 1 of FIG. 7B). Being subscribed to notifications, SMF 118 may receive from NRF 132 a message comprising a notification which indicates a failure of the Service A (svc-a) P-CSCF-1 192 (step 2 of FIG. 7B). In response, SMF 118 may select the Service A (svc-a) of P-CSCF-2 194, and send to NRF 132 a message indicating a binding indication for the Service A (svc-a) of P-CSCF-2 194 of Set 1 (step 3 of FIG. 7B). SMF 118 then initiates an address list update procedure for a reselection of the Service A (svc-a) of P-CSCF-2 194 for the UE as well as other UEs.

What is now described is a configuration utilizing both a first type of procedure involving a SMF-based failure detection monitoring (e.g. 3GPP Release 16 compliant; Release 16 SBI-based with eSBA support in both 5G Core and IMS core) (e.g. FIGS. 5A, 6, and 7A-7B) and a second type of procedure involving a UPF-based failure detection monitoring (e.g. 3GPP Pre-Release 16 compliant; Legacy Diameter Rx interface based, or Release 15 SBI based but without eSBA support) (e.g. FIGS. 2-4 and 5B).

Figure 8:
FIG. 8 is an illustrative example of a data table of stored information (e.g. at the SMF) for a plurality of application or control functions, including stored associations between a plurality of address informations of the application or control functions and a respective plurality of monitoring type indications associated with the application or control functions (e.g. for both for 3GPP Pre-Release 16 and 3GPP Release 16)

FIG. 8 is an illustrative example of a data table 800 of stored information for a plurality of application or control functions (e.g. P-CSCFs or AFs). Data table 800 may be utilized for both a first type of procedure involving an SMF-based failure detection monitoring and a second type of procedure involving a UPF-based failure detection monitoring. The stored information may be stored at the SMF or at least locally accessible by the SMF. The stored information may include stored associations between a plurality of address informations of the application or control functions and a respective plurality of capability indications associated with the application or control functions.

As illustrated in the example of FIG. 8, a first entry 802 of data table 800 indicates a P-CSCF address of a first P-CSCF corresponding to "1.1.1.1" and having a Fully-Qualified Domain Name (FQDN) of "ims1.pcscf.domain.com"; a second entry 804 indicates a P-CSCF address of a second P-CSCF corresponding to "2.2.2.2" and having a FQDN of "ims2.pcscf.domain.com"; a third entry 806 indicates a P-CSCF address of a third P-CSCF corresponding to "3.3.3.3" and having a FQDN of "ims1.e-pcscfdomain.com"; and a fourth entry 808 indicates a P-CSCF address of a fourth P-CSCF corresponding to "4.4.4.4" and having a FQDN of "ims2.e-pcscf.domain-.com". Each entry of data table 800 may include an indication of the Service Set to which the P-CSCF belongs (e.g. fourth entry 808 of data table 800 belongs to the Service Set corresponding to "PCSCF1.APP").

As further illustrated in the example of FIG. 8, each entry of data table 800 may include an indicator for P-CSCF service accessibility (e.g. Yes or No) which indicates whether the service is available or unavailable (e.g. detected failure). As further illustrated in the example of FIG. 8, each entry of data table 800 may include an indication for P-CSCF capability which indicates whether the P-CSCF is for 3GPP Release 16 (SBI with eSBA support in both the 5G Core and the IMS core) or for 3GPP Pre-release 16 (e.g. Legacy Diameter Rx interface or SBI without eSBA support). In some implementations, the SMF may invoke or utilize a first type of failure detection monitoring procedure for a P-CSCF associated with a first capability indication, and the SMF may invoke or utilize a second type of failure detection monitoring procedure for a P-CSCF associated with a second capability indication. See e.g. the method described in relation to FIG. 9.

Figure 9:
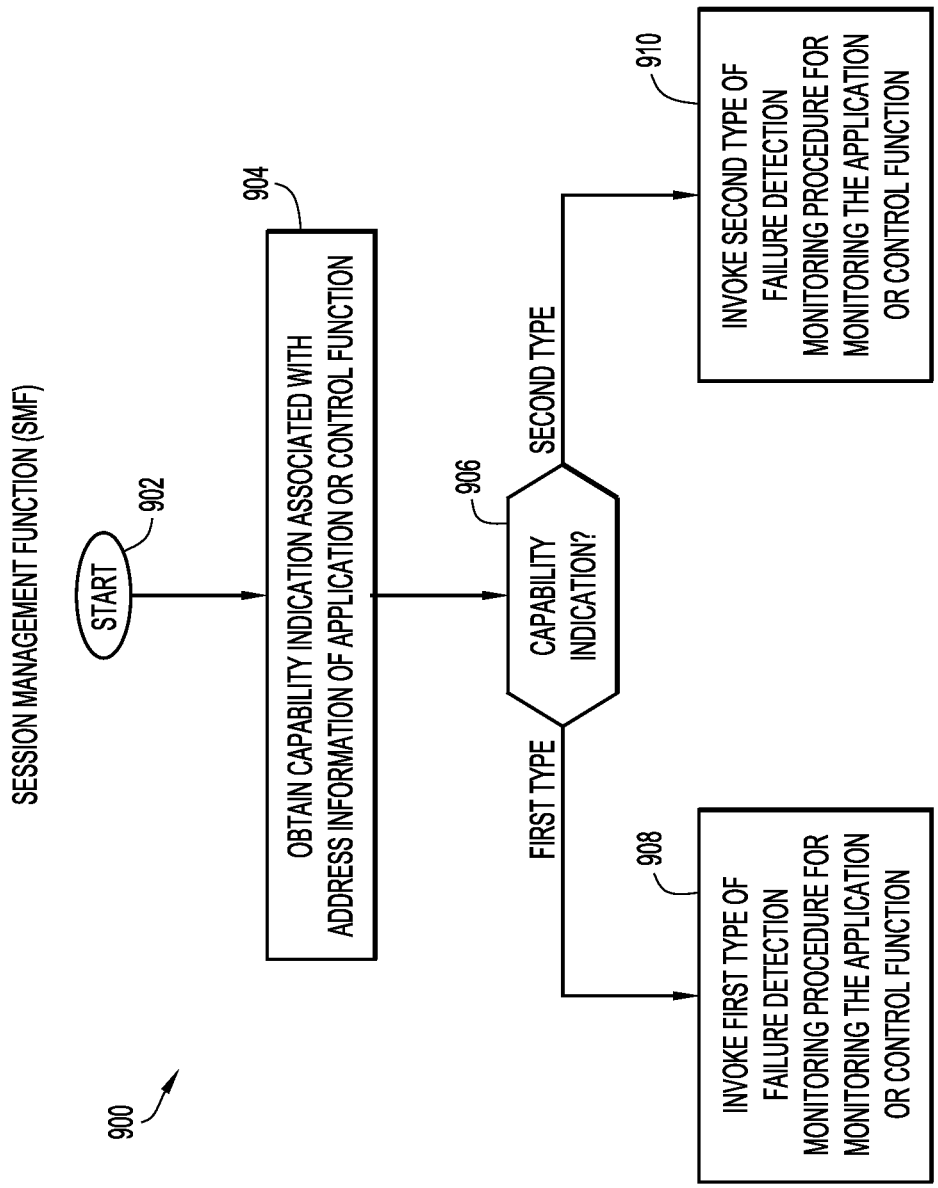
FIG. 9 is a flowchart for describing a method for use in failure detection monitoring of an application or control function for efficient service restoration according to some implementations of the present disclosure, which involves the use of the first and the second types of failure detection monitoring procedures (e.g. the methods of FIGS. 5A and 5B, respectively) (e.g. for both 3GPP Pre-Release 16 and 3GPP Release 16)

FIG. 9 is a flowchart 900 for describing a method for use in failure detection monitoring of an application or control function for efficient service restoration according to some implementations of the present disclosure. The method of FIG. 9 may be utilized for selection and use of a first type of procedure involving an SMF-based failure detection monitoring or a second type of procedure involving a UPF-based failure detection monitoring. The method of FIG. 9 may be performed by a computing device or a network node (e.g. an SMF) configured to connect in a network for communication. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as an SMF.

In the method of FIG. 9, the SMF may maintain access to stored information associated with a plurality of application or control functions (e.g. P-CSCFs or AFs). The plurality of application or control functions may be referred to as a plurality of selected application or control functions. The stored information may include stored associations between a plurality of address informations of these application or control functions and a respective plurality of capability indications associated with these application or control functions. For example, the SMF may maintain stored information and/or the data table 800 of FIG. 8 as described above.

Beginning at a start block 902, the SMF may obtain a capability indication associated with address information of an application or control function which is stored at the SMF (step 904 of FIG. 9). If the capability indication indicates a first type of capability (as identified at step 906 of FIG. 9), the SMF may invoke a first type of failure detection monitoring procedure for monitoring the application or control function (step 908 of FIG. 9). In some implementations, the first type of failure detection monitoring procedure may be the SMF-based failure detection monitoring procedure described in relation to the method of FIG. 5A (e.g. for 3GPP Release 16, SBI with eSBA support in both the 5G Core and the IMS core). On the other hand, if the capability indication indicates a second type of capability (as identified at step 906 of FIG. 9), the SMF may invoke a second type of failure detection monitoring procedure for monitoring the application or control function (step 908 of FIG. 9). In some implementations, the second type of failure detection monitoring procedure may be the UPF-based failure detection monitoring procedure described in relation to the method of FIG. 5B (e.g. for 3GPP Pre-release 16, Legacy Diameter Rx interface or SBI without eSBA support).

Figure 10:
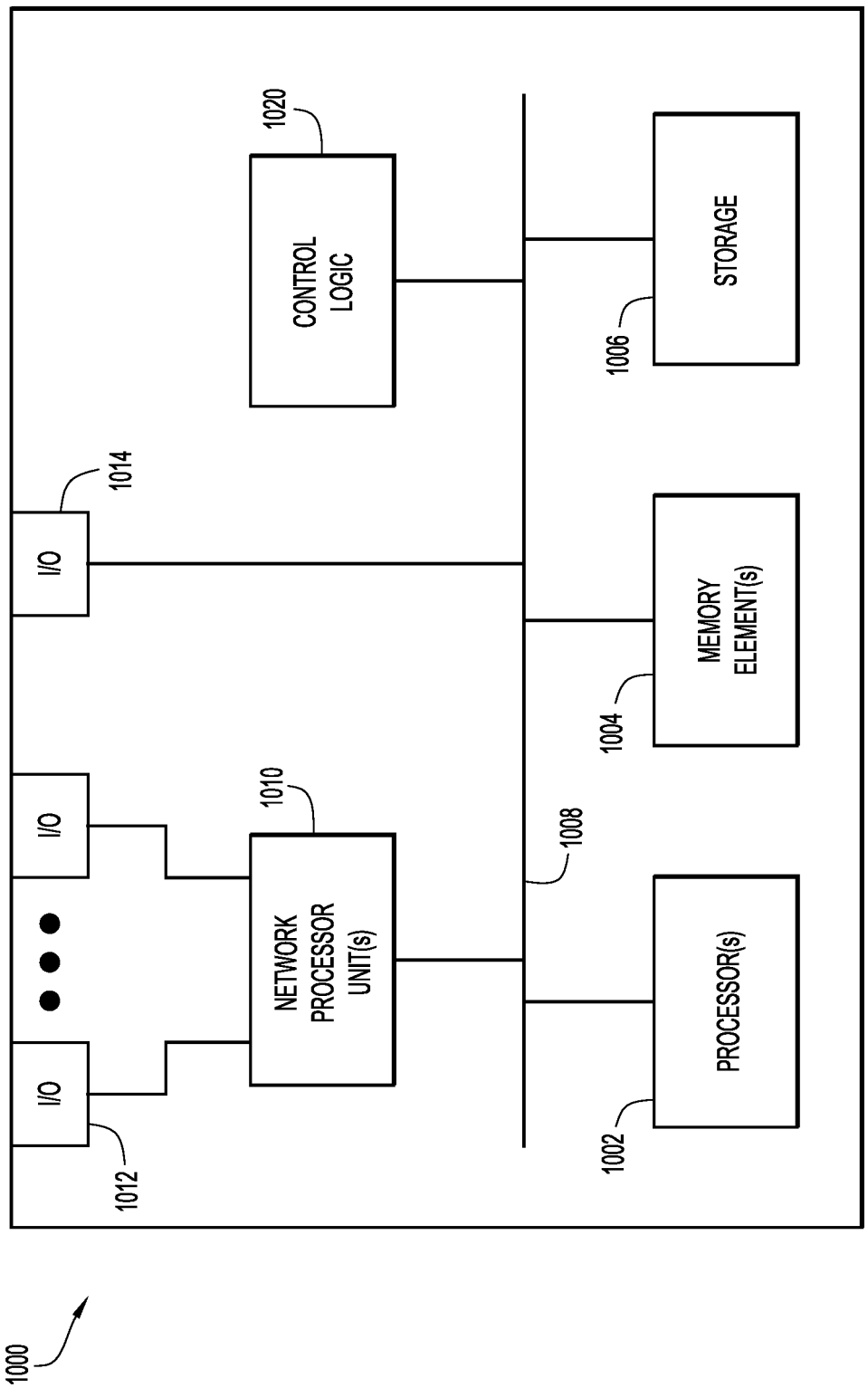
FIG. 10 illustrates a hardware block diagram of a computing device that may perform functions associated with operations discussed herein.

FIG. 10 illustrates a hardware block diagram of a computing device 1000 that may perform functions associated with operations discussed herein in connection with the techniques described in relation to the above figures, especially in relation to FIGS. 2-4, 5A-5B, 6, 7A-7B, 8, and 9. In various embodiments, a computing device, such as computing device 1000 or any combination of computing devices 1000, may be configured as any entity/entities as discussed for the techniques depicted in connection with the figures in order to perform operations of the various techniques discussed herein.

In at least one embodiment, the computing device 1000 may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, and/or any other I/O port(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to computer device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Thus, techniques and mechanisms for 5GS failure detection monitoring of an application or control function in a network for efficient restoration of service have been described. The network may be an IMS network and the voice or data service may be an IMS service that utilizes SIP signaling. The application or control function may be a P-CSCF of the IMS network; alternatively, the application or control function may be an AF.

In a first aspect of the present disclosure, a UPF of a mobile network may be configured to forward traffic for a voice or data service between one or more UEs operative in the mobile network and an application or control function of a network. In some implementations, the UPF may receive, from an SMF, a message which includes address information of the application or control function and store the address information in memory. The UPF may invoke a failure detection monitoring procedure for monitoring the application or control function associated with the address information of the application or control function. The failure detection monitoring procedure may include regularly performing a ping procedure (or health check procedure) with the application or control function using the address information. Sometime during operation, the UPF may identify a failure of the application or control function from the failure detection monitoring procedure. Based on the identifying, the UPF may send, to the SMF, a message for reporting the failure of the application or control function. The message may trigger, at the SMF, an initiation of an address list update procedure for a reselection of a new application or control function of the network for the voice or data service by the one or more UEs. The one or more UEs may be a plurality of UEs which are updated with new address information (e.g. without the failed address information) for the voice or data service. In some implementations, the ping procedure may involve sending a SIP OPTIONS message to query for operational status of the application or control function. In other implementations, the ping procedure may involve sending an ICMP echo request message to the application or control function. According to the first aspect, the UPF which performs the failure detection monitoring procedure may be for use in a mobile network which interconnects to the IMS network via a Diameter Rx interface or an SBI without eSBA support (e.g. Pre-release 16).

In a second aspect of the present disclosure, an SMF of the mobile network may be configured to manage one or more sessions of a UPF which is operative to forward traffic for a voice or data service between one or more UEs in the mobile network and an application or control function of a network. The SMF may invoke a failure detection monitoring procedure for monitoring the application or control function associated with address information which is stored at the SMF. In the failure detection monitoring procedure, the SMF may receive, from an NRF, a message comprising a notification or response which indicates a failure of the application or control function of the network. Based on receiving the message comprising the notification or response which indicates the failure, the SMF may initiate an address list update procedure for a reselection of a new application or control function for the voice or data service by the one or more UEs. The one or more UEs may be a plurality of UEs which are updated with new address information (e.g. without the failed address information) for the voice or data service. In some implementations, invoking the failure detection monitoring procedure may involve subscribing to notifications of the NRF based on the address information for identifying failure of the application or control function. In other implementations, invoking the failure detection monitoring procedure may involve initiating a regular sending, to the NRF, of a message which indicates a request for information associated with the application or control function for identifying failure of the application or control function. According to the second aspect, the SMF which performs the failure detection monitoring procedure may be configured for use in a mobile network which interconnects to the IMS network via the SBI with the eSBA support (e.g. 3GPP Release 16).

In a third aspect of the present disclosure, an SMF may maintain access to (or store) stored information for a plurality of selected application or control functions, including stored associations between a plurality of address informations of the selected application or control functions and a respective plurality of capability indications associated with the selected application or control functions. The SMF may invoke one of a first or a second type of failure detection monitoring procedure for a given one of the selected application or control functions based on a respective one of the capability indications associated therewith. In some implementations, the SMF may obtain a capability indication associated with address information of an application or control function which is stored at the SMF. If the capability indication indicates a first type of capability, the SMF may invoke the first type of failure detection monitoring procedure for monitoring the application or control function. On the other hand, if the capability indication indicates a second type of capability, the SMF may invoke the second type of failure detection monitoring procedure for monitoring the application or control function. In some implementations, the first type of failure detection monitoring procedure may be used for a mobile network which interconnects to the IMS network via the SBI with the eSBA support (e.g. Release 16). The second type of failure detection monitoring procedure may be used for a mobile network which interconnects to the IMS network via a Diameter Rx interface or an SBI without eSBA support (e.g. 3GPP Pre-release 16).

Again, an SMF may maintain access to stored information for a plurality of selected application or control functions, and these selected application or control functions may include first and second application or control functions. In some preferred implementations, the SMF may invoke the first type of failure detection monitoring procedure for monitoring the first application or control function of a first network associated with first address information which is stored at the SMF. In the first type of failure detection monitoring procedure, the SMF may receive, from the NRF, a message comprising a notification or response which indicates a failure of the first application or control function of the first network. Based on receiving the message comprising the notification or response which indicates the failure, the SMF may initiate a first address list update procedure for a reselection of a first new application or control function for the voice or data service. The one or more UEs may be a plurality of UEs which are updated with new address information (e.g. without the failed address information) for the voice or data service. In some implementations, invoking the first type of failure detection monitoring procedure may involve subscribing to notifications of the NRF based on the first address information for identifying failure of the first application or control function. In other implementations, invoking the first type of failure detection monitoring procedure may involve initiating a regular sending, to the NRF, of a message which indicates a request for information associated with the first application or control function for identifying failure of the first application or control function. Also in the third aspect, the SMF may invoke the second type of failure detection monitoring procedure for monitoring the second application or control function of a second network associated with second address information which is stored at the SMF. Here, invoking the second type of failure detection monitoring procedure may involve sending, to the UPF, a message for configuring the second address information of the second application or control function in the UPF, so that the UPF is enabled to regularly perform a ping procedure (or health check procedure) with the second application or control function using the second address information. In the second type of failure detection monitoring procedure, the SMF may receive, from the UPF, a message for reporting a failure of the second application or control function. Based on receiving the message for reporting the failure, the SMF may initiate initiating a second address list update procedure for a reselection of a second new application or control function of the second network for the voice or data service. The one or more UEs may be a plurality of UEs which are updated with new address information (e.g. without the failed address information) for the voice or data service. In some implementations, the ping procedure may involve sending a SIP OPTIONS message to query for operational status of the second application or control function. In other implementations, the ping procedure may involve sending an ICMP echo request message to the second application or control function.

As is apparent, with the solutions described herein, the KPIs for Voice over 5G New Radio (VoNR) service availability will be improved and the user experience for voice and video services may be enhanced.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The invention claimed is:

1. A method comprising:
   at a user plane function (UPF) for use in a mobile network, and configured to forward traffic in a protocol data unit (PDU) session for a voice or data service between a user equipment (UE) operative in the mobile network and an application or control function of a network,
      receiving, via an N4 interface, a host monitoring rule from a session management function (SMF) which manages the PDU session, the host monitoring rule including address information of the application or control function;
      installing the host monitoring rule in the UPF;
      invoking a failure detection monitoring procedure for monitoring the application or control function based on the host monitoring rule, which includes regularly performing, by the UPF, a ping procedure with the application or control function using the address information of the application or control function;
      identifying a failure of the application or control function from the failure detection monitoring procedure; and
      based on the identifying, sending, via the N4 interface to the SMF, a message for reporting the failure of the application or control function, for triggering an initiation of an address list update procedure for a reselection of a new application or control function of the network for the voice or data service by the UE.

2. The method of claim 1, wherein the network comprises an Internet Protocol (IP) Multimedia Subsystem (IMS) network, the voice or data service comprises an IMS service that utilizes Session Initiation Protocol (SIP) signaling, and the PDU session comprises an IMS PDU session.

3. The method of claim 2, wherein the application or control function comprises a Proxy-Call Session Control Function (P-CSCF).

4. The method of claim 2, wherein the ping procedure comprises sending a SIP OPTIONS message to query for operational status of the application or control function, or sending an Internet Control Message Protocol (ICMP) echo request message to the application or control function.

5. The method of claim 1, wherein a Packet Forwarding Control Protocol (PFCP) session is established between the SMF and the UPF via the N4 interface for management of the PDU session, and wherein:
sending the message for reporting the failure of the application or control function comprises sending a PFCP message which indicates a path status of the application or control function.

6. The method of claim 2, wherein the UPF is for use in the mobile network which interconnects to the IMS network via a Diameter Rx interface or a Service-Based Interface (SBI) without an enhanced Service-Based Architecture (eSBA) support.

7. The method of claim 1, wherein a Packet Forwarding Control Protocol (PFCP) session is established between the SMF and the UPF via the N4 interface for management of the PDU session, and wherein:
receiving the host monitoring rule comprises receiving a PFCP message which includes an IP address and a port number of the application or control function, and
invoking the failure detection monitoring procedure for monitoring the application or control function is performed in response to receiving the PFCP message which includes the IP address and the port number of the application or control function.

8. The method of claim 1, wherein sending the message for reporting the failure of the application or control function for triggering the initiation of the address list update procedure further triggers the reselection of the new application or control function by one or more other UEs having PDU sessions at the UPF and associated with the application or control function having the failure.

9. A method comprising:
at a session management function (SMF) for use in a mobile network, and configured to manage one or more sessions of a user plane function (UPF) which is operative to forward traffic for a voice or data service between one or more user equipments (UEs) in the mobile network and an application or control function of a network,
invoking a failure detection monitoring procedure for monitoring the application or control function associated with address information which is stored at the SMF, which includes subscribing to, by the SMF, notifications of a network function (NF) repository function (NRF) regarding status of the application or control function;
in the failure detection monitoring procedure, receiving, from the NRF, a message comprising a notification which indicates a failure of the application or control function of the network;
based on receiving the message comprising the notification which indicates the failure, initiating an address list update procedure for a reselection of a new application or control function for the voice or data service by the one or more UEs; and
prior to invoking the failure detection monitoring procedure,
receiving, from the NRF, a first profile of a first application or control function and a second profile of a second application or control function, the first application or control function and the second application or control function being in an NF Set; and
selecting the first application or control function of the NF Set as the application or control function for the voice or the data service.

10. The method of claim 9, wherein the network comprises an Internet Protocol (IP) Multimedia Subsystem (IMS) network and the voice or data service comprises an IMS service that utilizes Session Initiation Protocol (SIP) signaling.

11. The method of claim 10, wherein the application or control function comprises a Proxy-Call Session Control Function (P-CSCF).

12. The method of claim 10, wherein the SMF is configured for use in the mobile network which interconnects to the IMS network via a Service-Based Interface (SBI) having an enhanced Service-Based Architecture (eSBA) support.

13. The method of claim 9, further comprising:
at the SMF, after receiving the message comprising the notification which indicates the failure,
selecting the second application or control function of the NF Set as the new application or control function for the voice or data service.

14. The method of claim 9, wherein the application or control function comprises a first application or control function, the address information comprises first address information, the failure detection monitoring procedure comprises a first type of failure detection monitoring procedure, the address list update procedure comprises a first address list update procedure, the new application or control function comprises a first new application or control function, the network comprises a first network, and the one or more UEs comprise one or more first UEs, and wherein the UPF is configured to forward traffic for the voice or data service between one or more second UEs operative in the mobile network and a second application or control function of a second network, the method further comprising:
at the SMF,
invoking a second type of failure detection monitoring procedure for monitoring the second application or control function associated with second address information which is stored at the SMF;
wherein invoking the second type of failure detection monitoring procedure comprises sending, to the UPF, a message for configuring the second address information of the second application or control function in the UPF, so that the UPF is enabled to regularly perform a ping procedure with the second application or control function using the second address information;
in the second type of failure detection monitoring procedure, receiving, from the UPF, a message for reporting a failure of the second application or control function; and
based on receiving the message for reporting the failure, initiating a second address list update procedure for a reselection of a second new application or control function of the second network for the voice or data service by one or more second UEs.

15. The method of claim 14, wherein:
the second network comprises an Internet Protocol (IP) Multimedia Subsystem (IMS) network and the voice or data service comprises an IMS service that utilizes Session Initiation Protocol (SIP) signaling, and the SMF is for use in the mobile network which interconnects to the IMS network via a Diameter Rx interface or a Service-Based Interface (SBI) without an enhanced Service-Based Architecture (eSBA) support.

16. The method of claim 14, further comprising:

at the SMF, maintaining access to stored information for a plurality of selected application or control functions, including stored associations between a plurality of addresses of the selected application or control functions and a respective plurality of monitoring type indications associated with the selected application or control functions; and invoking one of the first or the second type of failure detection monitoring procedures for a given one of the selected application or control functions based on a respective one of the monitoring type indications associated therewith, wherein the selected application or control functions include the first and the second application or control functions.

17. A computing device comprising:

one or more interfaces to connect in a mobile network for communication;

one or more processors; and one or more memory elements for storing instructions executable on the one or more processors for operation as a session management function (SMF), which is configured to manage one or more sessions of a user plane function (UPF) which operates to forward traffic for a voice or data service between one or more user equipments (UEs) in the mobile network and an application or control function of a network, the instructions being further executable for:

invoking a failure detection monitoring procedure for monitoring the application or control function associated with address information which is stored at the SMF, which includes performing a regular or a periodic querying of information associated the application or control function from a network function (NF) repository function (NRF) via a Service-Based Interface (SBI);

in the failure detection monitoring procedure, receiving, from the NRF via the SBI, a response which indicates a failure of the application or control function of the network;

based on receiving the response which indicates the failure, initiating an address list update procedure for a reselection of a new application or control function for the voice or data service by the one or more UEs; and prior to invoking the failure detection monitoring procedure, receiving, from the NRF, a first profile of a first application or control function and a second profile of a second application or control function, the first application or control function and the second application or control function being in an NF Set; and selecting the first application or control function of the NF Set as the application or control function for the voice or the data service.

18. The computing device of claim 17, wherein:

the network comprises an Internet Protocol (IP) Multimedia Subsystem (IMS) network and the voice or data service comprises an IMS service that utilizes Session Initiation Protocol (SIP) signaling, the application or control function comprises a Proxy-Call Session Control Function (P-CSCF), the SMF is configured for use in the mobile network which interconnects to the IMS network via the SBI having an enhanced Service-Based Architecture (eSBA) support, and each one of the regular or the periodic querying of information associated the application or control function comprises sending a Hypertext Transfer Protocol (HTTP) GET request for the information.

19. The computing device of claim 17, wherein the application or control function comprises a first application or control function, the address information comprises first address information, the failure detection monitoring procedure comprises a first type of failure detection monitoring procedure, the address list update procedure comprises a first address list update procedure, the new application or control function comprises a first new application or control function, the network comprises a first network, and the one or more UEs comprise one or more first UES, and wherein the UPF is configured to forward traffic for the voice or data service between one or more second UEs operative in the mobile network and a second application or control function of a second network, the instructions being further executable for:

invoking a second type of failure detection monitoring procedure for monitoring the second application or control function associated with second address information which is stored at the SMF;

wherein invoking the second type of failure detection monitoring procedure comprises sending, to the UPF, a message for configuring the second address information of the second application or control function in the UPF, so that the UPF is enabled to regularly perform a ping procedure with the second application or control function using the second address information;

in the second type of failure detection monitoring procedure, receiving, from the UPF, a message for reporting a failure of the second application or control function; and based on receiving the message for reporting the failure, initiating a second address list update procedure for a reselection of a second new application or control function of the second network for the voice or data service by one or more second UEs.

20. The computing device of claim 17, wherein the instructions are further executable for:

after receiving the response indicating the failure, selecting the second application or control function of the NF Set as the new application or control function for the voice or data service.

* * * * *